US009689382B2

(12) United States Patent
Tucker et al.

(10) Patent No.: US 9,689,382 B2
(45) Date of Patent: Jun. 27, 2017

(54) INTEGRATED ENERGY GENERATING DAMPER

(71) Applicant: Levant Power Corporation, Woburn, MA (US)

(72) Inventors: Clive Tucker, Charlestown, MA (US); Ross J. Wendell, Medford, MA (US); Zackary Martin Anderson, Cambridge, MA (US); Evan Moen, Davisburg, MI (US); Johannes Schneider, Cambridge, MA (US); Zachary J. Jackowski, Somerville, MA (US); Sean C. Morton, Somerville, MA (US)

(73) Assignee: ClearMotion, Inc., Woburn, MA (US)

( * ) Notice: Subject to any disclaimer, the term of this patent is extended or adjusted under 35 U.S.C. 154(b) by 33 days.

(21) Appl. No.: 14/681,630

(22) Filed: Apr. 8, 2015

(65) Prior Publication Data
US 2015/0316039 A1    Nov. 5, 2015

Related U.S. Application Data

(63) Continuation of application No. 13/704,138, filed as application No. PCT/US2011/040654 on Jun. 16, 2011, now Pat. No. 9,035,477.
(Continued)

(51) Int. Cl.
*F03G 7/08* (2006.01)
*B60G 11/26* (2006.01)
(Continued)

(52) U.S. Cl.
CPC .............. *F03G 7/08* (2013.01); *B60G 11/265* (2013.01); *F01C 1/103* (2013.01); *F01C 9/002* (2013.01);
(Continued)

(58) Field of Classification Search
CPC ... F03G 7/08; B60G 11/265; B60G 2400/252; F01C 1/103; F01C 9/002; F01C 13/00; F03C 1/26
See application file for complete search history.

(56) References Cited

U.S. PATENT DOCUMENTS

| 998,128 A | 7/1911 | Smith |
| 1,116,293 A | 11/1914 | Kane |

(Continued)

FOREIGN PATENT DOCUMENTS

| CN | 1325799 A | 12/2001 |
| CN | 1370926 A | 9/2002 |

(Continued)

OTHER PUBLICATIONS

[No Author Listed] Ride control innovation, accelerated[SM]. Forward thinking. Forward moving. ACOCAR. Tenneco. Sep. 2011.
(Continued)

*Primary Examiner* — Michael Zarroli
(74) *Attorney, Agent, or Firm* — Wolf, Greenfield & Sacks, P.C.

(57) ABSTRACT

A linear energy harvesting device that includes a housing and a piston that moves at least partially through the housing when it is compressed or extended from a rest position. When the piston moves, hydraulic fluid is pressurized and drives a hydraulic motor. The hydraulic motor drives an electric generator that produces electricity. Both the motor and generator are central to the device housing. Exemplary configurations are disclosed such as monotube, twin-tube, tri-tube and rotary based designs that each incorporates an integrated energy harvesting apparatus. By varying the electrical characteristics on an internal generator, the kinematic characteristics of the energy harvesting apparatus can be dynamically altered. In another mode, the apparatus can be used as an actuator to create linear movement. Applications
(Continued)

include vehicle suspension systems (to act as the primary damper component), railcar bogie dampers, or industrial applications such as machinery dampers and wave energy harvesters, and electro-hydraulic actuators.

22 Claims, 18 Drawing Sheets

Related U.S. Application Data

(60) Provisional application No. 61/467,161, filed on Mar. 24, 2011, provisional application No. 61/355,186, filed on Jun. 16, 2010.

(51) Int. Cl.
*F01C 1/10* (2006.01)
*F01C 9/00* (2006.01)
*F01C 13/00* (2006.01)
*F03C 1/26* (2006.01)

(52) U.S. Cl.
CPC .............. *F01C 13/00* (2013.01); *F03C 1/26* (2013.01); *B60G 2400/252* (2013.01)

(56) References Cited

U.S. PATENT DOCUMENTS

| | | |
|---|---|---|
| 1,290,293 A | 1/1919 | Morski |
| 2,194,530 A | 3/1940 | Torstensson |
| 2,885,202 A | 5/1959 | Tramper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,641,152 A | 6/1997 | Angles et al. |
| 5,659,205 A | 8/1997 | Weisser et al. |
| 5,682,980 A | 11/1997 | Reybrouck |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,441,508 B1 | 8/2002 | Hylton |
| 6,519,939 B1 | 2/2003 | Duff |
| 6,559,553 B2 | 5/2003 | Yumita et al. |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |
| 6,952,060 B2 | 10/2005 | Goldner et al. |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,195,250 B2 | 3/2007 | Knox et al. |
| 7,198,125 B2 | 4/2007 | Skelcher et al. |
| 7,335,999 B2 | 2/2008 | Potter |
| 7,336,002 B2 | 2/2008 | Kato et al. |
| 7,392,998 B2 | 7/2008 | Runkel |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,938,217 B2 | 5/2011 | Stansbury |
| 8,063,498 B2 | 11/2011 | Namuduri et al. |
| 8,079,436 B2 | 12/2011 | Tikkanen et al. |
| 8,080,888 B1 | 12/2011 | Daley |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |

(56) References Cited

U.S. PATENT DOCUMENTS

| | | |
|---|---|---|
| 8,590,679 B2 | 11/2013 | Hall |
| 8,672,337 B2 | 3/2014 | Van Der Knaap et al. |
| 8,776,961 B2 | 7/2014 | Mori et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0212273 A1 | 10/2004 | Gould |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238396 A1 | 10/2008 | Ng et al. |
| 2008/0257626 A1 | 10/2008 | Carabelli et al. |
| 2009/0015202 A1 | 1/2009 | Miura |
| 2009/0192674 A1 | 7/2009 | Simons |
| 2009/0212649 A1 | 8/2009 | Kingman et al. |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Bavetta et al. |
| 2010/0217491 A1 | 8/2010 | Naito et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0305347 A1 | 12/2012 | Mori et al. |
| 2013/0147205 A1 | 6/2013 | Tucker et al. |
| 2013/0154280 A1 | 6/2013 | Wendell et al. |
| 2013/0264158 A1 | 10/2013 | Hall |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| DE | 3937987 A1 | 5/1991 |
| DE | 195 35 752 A1 | 3/1997 |
| EP | 1878598 | 1/2008 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | 3-123981 U1 | 12/1991 |
| JP | H05-50195 U | 7/1993 |
| JP | 8-226377 A2 | 9/1996 |
| JP | 2001-311452 A | 9/2001 |
| JP | 2003/035254 | 2/2003 |
| JP | 2005-521820 | 7/2005 |
| JP | 2008-536470 A | 9/2008 |
| WO | WO 97/26145 A | 7/1997 |
| WO | WO 2007/071362 A1 | 6/2007 |
| WO | WO 2010/066416 A1 | 6/2010 |
| WO | WO 2011/159874 A2 | 12/2011 |
| WO | WO 2012/167316 A1 | 12/2012 |

OTHER PUBLICATIONS

Cleasby et al., A novel high efficiency electrohydrostatic flight simulator motion system. Fluid Pow Mot Control. Centre for PTMC, UK. 2008;437-449.

Kaminaga et al., Mechanism and Control of knee power augmenting device with backdrivable electro-hydrostatic actuator. 13th World congress Mechanism Machine Science. Jun. 19-25, 2011. 1-10.

Shen et al., Automative electric power and energy mangement—a system approach. Business Briefing: Global Automotive Manufacturing and Technology. 2003:1-5.

Vandersmissen, ACOCAR active suspension. Vehicle Dynamics Expo. Stuttgart, Jul. 5, 2008. 24 pages.

Vandersmissen et al., The new Tenneco ACOCAR active suspension. Vehicle Dynamics Expo. Stuttgart, Jun. 22-24, 2010. 19 pages.

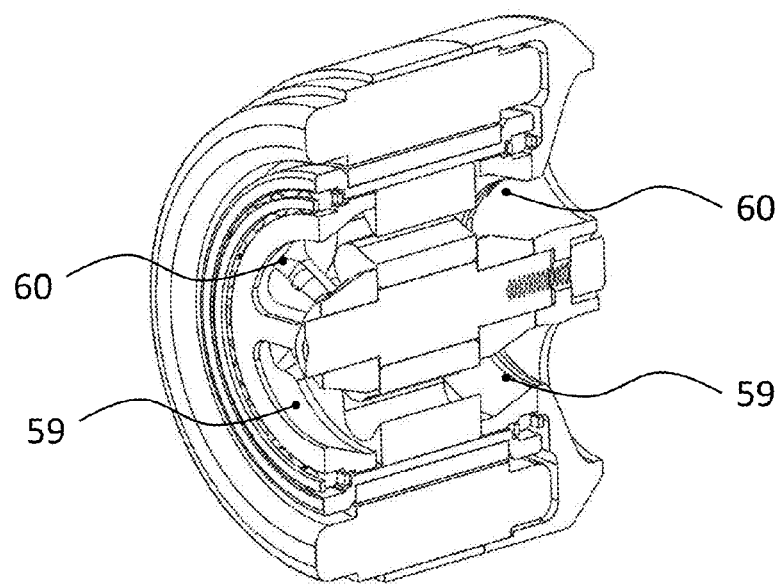
FIG. 3A
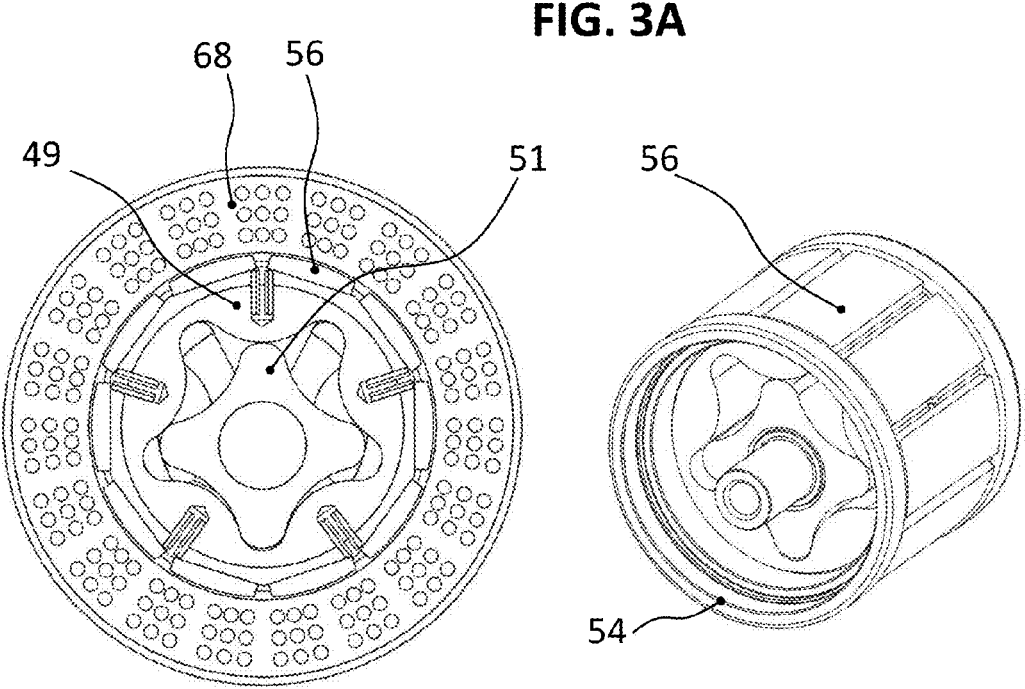
FIG. 3B   FIG. 3C

INTEGRATED ENERGY GENERATING DAMPER

RELATED APPLICATIONS

This application is a Continuation of U.S. application Ser. No. 13/704,138, filed Mar. 11, 2013, now U.S. Pat. No. 9,035,477, which is a National Stage filing under 35 U.S.C. §371 of International Application PCT/US2011/040654, filed Jun. 16, 2011, which claims the benefit under 35 U.S.C. §119(e) of U.S. provisional application Ser. No. 61/467,161, filed Mar. 24, 2011, and U.S. provisional application Ser. No. 61/355,186, filed Jun. 16, 2010, the disclosures of which are incorporated by reference herein in their entirety.

BACKGROUND

1. Field

Aspects relate to damper systems and linear and rotary energy capture systems that capture energy associated with relative motion.

2. Discussion of Related Art

A typical damper dissipates energy associated with motion. Linear dampers typically include a housing with a piston positioned inside that is movable in both a compression stroke and an extension stroke. An orifice is positioned in the piston. The motion of the piston causes a viscous fluid to pass through the orifice as the piston moves in order to dampen motion.

Primary damper technologies have been in use for decades and can be split into two main groups: monotube dampers and twin-tube dampers (although certain tri-tube dampers have been produced, these are used for specialized adaptive dampers and are not in widespread production). Monotube dampers feature a hydraulic ram with orifices in the piston head and a gas-filled reservoir inside the main fluid chamber. Twin-tube dampers feature two concentric tubes with an inner tube filled with hydraulic fluid and the external tube containing fluid and gas or some other compressible medium.

SUMMARY

Conventional dampers, when providing dampening, dissipate a significant amount of energy as heat. The inventors have appreciated that improvements on conventional damper technologies can provide energy recovery and dynamic damping control capabilities [while sharing a considerable number of parts with conventional low-cost damper technologies].

Aspects relate to an energy-generating device that captures energy associated with relative motion, whilst providing damping to movement—in a compact, self-contained apparatus, offering the ability to be a direct replacement for non-energy harvesting dampers.

According to one aspect, an energy-generating damper contains a piston head with an integrated hydraulic motor (which, in some embodiments, may be a positive displacement motor) that includes a first port and a second port. The first port is in fluid communication with a compression volume and a second port is in fluid communication with an extension volume. The piston head further contains an electric generator that is directly coupled to the hydraulic motor. The fluid flow causes the hydraulic motor to rotate and hence rotates the electric generator which produces electricity. According to another aspect, an energy-generating damper comprises a housing that includes a compression volume and an extension volume. A piston head that contains an integrated hydraulic motor with a first port and a second port is disposed in the housing. The first port is in fluid communication with the compression volume and the second port is in fluid communication with the extension volume. The piston head further to includes an electric generator that that is directly coupled to the hydraulic motor, so that rotation of the hydraulic motor causes rotation of the electric generator which produces electricity as it rotates. In a first mode, the piston moves through at least a portion of a jounce (compression) stroke which causes fluid to flow from the compression volume to the first port, rotating the hydraulic motor and generator, producing electricity. In a second mode, the piston moves at least partially through a rebound (extension) stroke which causes fluid to flow from the extension volume to the second port, counter-rotating the hydraulic motor and generator, producing electricity. A fluid reservoir is in fluid communication with either the compression or extension volume. According to another aspect, an energy-generating damper comprises an inner housing that includes a compression volume and an extension volume. A piston is disposed in the inner housing. In a first mode, the piston moves through at least a portion of a jounce stroke to displace hydraulic fluid from the compression volume. In a second mode, the piston moves at least partially through a rebound stroke to displace hydraulic fluid from the extension volume. An outer tube is concentric with the inner tube containing the compression and extension volumes. The outer tube contains the low-pressure volume. The low-pressure volume contains a compressible medium. The piston head disposed in the inner housing contains an integrated hydraulic motor that includes a first port and a second port. The first port is in fluid communication with the compression volume and the second port is in fluid communication with the extension volume. The piston rod is hollow and contains a shaft that connects the hydraulic motor on the piston head with an electric generator on the other end of the piston rod. Rotation of the hydraulic motor causes rotation of the electric generator. Damping is provided by the electric generator, through the shaft inside the piston-rod, to the hydraulic motor, in order to restrict fluid flow between the compression volume and the extension volume. One or more valves restrict flow into and out of the low-pressure volume such that during jounce fluid flows from the compression volume to the low-pressure volume, and then into the extension volume, the compressible medium in the low pressure volume compressing to accept the rod volume. During rebound, fluid flows from the low-pressure volume to the compression volume the compressible medium expanding to replace piston rod volume.

According to another aspect, an energy-generating damper contains a base valve at the opposite end of the damper from the fixed rod end. The base valve comprises of a hydraulic motor that includes a first port and a second port. The hydraulic motor is coupled with an to electric motor. Rotation of the hydraulic motor causes rotation of the electric generator. The energy-generating damper further includes two concentric tubes with an inner housing that includes a compression volume and an extension volume. A piston is disposed in the inner housing. In a first mode, the piston moves through at least a portion of a jounce stroke to displace hydraulic fluid from the compression volume. In a second mode, the piston moves at least partially through a rebound stroke to displace hydraulic fluid from the extension volume. An outer tube is concentric with the inner tube containing the compression and extension volumes. The outer tube contains the low-pressure volume. The low-pressure volume contains a compressible medium. The first port of the hydraulic motor is in fluid communication with, either directly or through valving, the extension volume and the second port of the hydraulic motor is in fluid communication with, either directly or through valving, the low pressure volume containing the compressible medium.

According to another aspect, an energy-generating damper comprises an inner housing that includes a compression volume and an extension volume. A piston is disposed in the inner housing. In a first mode, the piston moves through at least a portion of a jounce stroke to displace hydraulic fluid from the compression volume. In a second mode, the piston moves at least partially through a rebound stroke to displace hydraulic fluid from the extension volume. A second tube is concentric to and outside of the inner tube containing the compression and extension volumes. The space between the second tube and the inner tube contains the high-pressure volume. A third tube is concentric to and outside of the second tube. The space between the third tube and the second tube contains the low-pressure volume. The high-pressure and low-pressure volumes may also be configured as being between the third tube and second tube, and the second tube and inner tube, respectively. The low-pressure volume contains a compressible medium. A hydraulic motor that includes a first port and a second port is connected. The first port is in fluid communication with the high-pressure volume and the second port is in fluid communication with the low-pressure volume. One or more valves restrict and/or direct flow such that during jounce, the compression volume is connected to the high-pressure volume and the extension volume is connected to the low-pressure volume, and such that during rebound, the compression volume is connected to the low-pressure volume and the extension volume is connected to the high-pressure volume. Therefore in this aspect, flow through the hydraulic motor is unidirectional and spins during both jounce stroke and rebound stroke modes. The hydraulic motor is coupled with an electric motor. Rotation of the hydraulic motor causes to rotation of the electric generator.

According to another aspect, an energy-generating damper comprises an inner housing that includes a compression volume and an extension volume. A piston is disposed in the inner housing. In a first mode, the piston moves through at least a portion of a jounce (compression) stroke to displace hydraulic fluid from the compression volume. In a second mode, the piston moves at least partially through a rebound (extension) stroke to displace hydraulic fluid from the extension volume. A hydraulic motor is connected to a shaft that connects to an electric generator that produces electricity when its shaft spins. The hydraulic motor has a first port that connects to the compression volume and a second port that is in fluid communication with the extension volume. In this regard, in one embodiment, the second port is directly connected to the extension volume, for example, as in the integrated piston head or the hydraulic motor piston head and piston rod opposed electric generator embodiments. In another embodiment, the second port is connected via the outer tube, for example, as in the base valve configuration. The hydraulic motor and the electric generator are coupled such that rotation of one causes rotation of the other. An outer tube is concentric with the inner tube containing the compression and extension volumes. The outer tube contains an outer volume that is in fluid communication with the extension volume. Both the extension volume (via the outer volume) and the compression volume are in fluid communication with a valve block that operates such that an accumulator also attached to the valve block is in fluid communication with the lower pressure volume, either the compression volume or the extension volume.

According to another aspect, an energy-generating damper comprises a housing that includes a compression volume and an extension volume. A piston is disposed in the housing. In a first mode, the piston moves through at least a portion of a jounce (compression) stroke to displace hydraulic fluid from the compression volume. In a second mode, the piston moves at least partially through a rebound (extension) stroke to displace hydraulic fluid from the extension volume. The piston head contains an integrated hydraulic motor that includes a first port and a second port. The first port is in fluid communication with the compression volume and the second port is in fluid communication with the extension volume. The piston head further contains an electric generator that produces electricity when its shaft spins. The piston-head-mounted hydraulic motor and electric generator are coupled such that rotation of one causes rotation of the other. The piston rod is double ended, with a rod section on each side of the piston head, each going through the compression and extension volumes, respectively, and to exiting the housing from opposite sides.

According to another aspect, an energy-generating damper comprises an integrated motor and generator coupled to a rotary damper. The integrated motor-generator comprises of a hydraulic motor that includes a first port and a second port. The hydraulic motor is coupled with an electric motor. Rotation of the hydraulic motor causes rotation of the electric generator. The energy-generating rotary damper further contains an input lever that is connected to a first volume(s) and a second volume(s). In first mode the input lever rotates through at least a portion of a stroke to displace fluid from the first volume. In second mode the input lever rotates through at least a portion of the stroke to displace fluid from the second volume. The first port of the hydraulic motor is in fluid communication with the first volume and the second port in the hydraulic motor is in fluid communication with the second volume.

According to another aspect, an energy-generating actuator contains a base valve at the opposite end of the piston rod. The base valve comprises of a hydraulic motor that includes a first port and a second port. The hydraulic motor is coupled with an electric motor. Rotation of the hydraulic motor causes rotation of the electric generator. The energy-generating actuator further contains two concentric tubes with an inner housing that includes a compression volume and an extension volume. A piston is disposed in the inner housing. In a first mode, the piston moves through at least a portion of a compression stroke to pressurize hydraulic fluid in the compression volume. In a second mode, the piston moves at least partially through an extension stroke to pressurize hydraulic fluid in the extension volume. An outer tube is concentric with the inner tube containing the compression and extension volumes. The outer tube contains the low-pressure volume and is in fluid connection with the extension volume. The low-pressure volume contains a compressible medium. The first port of the hydraulic motor is in fluid communication with, either directly or through valving, the compression volume and the second port of the hydraulic motor is in fluid communication with, either directly or through valving, the low pressure volume containing the compressible medium.

According to another aspect, an energy-generating actuator contains a base valve at the opposite end of the piston rod. The base valve comprises of a hydraulic motor that includes a first port and a second port. The hydraulic motor is coupled with an electric motor. The base valve is connected to the actuator by a rectifying hydraulic circuit so the direction of rotation of the hydraulic unit remains constant regardless of the direction of stroke of the actuator.

According to another aspect, the energy-generating dampers described in the previous to paragraphs may include one or more directional and or fluid restrictive valves that provide fluid communication between the compression volume and the extension volume to bypass fluid around or to restrict fluid through the hydraulic motor.

According to another aspect, the energy-generating dampers described in the previous paragraphs are used with a controller that recovers generated energy and controls the kinematic characteristic on the energy-generating damper. The controller in one aspect is wholly powered by the energy-generating damper.

According to another aspect, the energy-generating dampers described in the previous paragraphs are used with a spring assembly to force the piston rod into an extended state. According to another aspect, the energy-generating dampers described in the previous paragraphs are used with a spring assembly to force the piston rod into a compressed state.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3, 3A, 3B and 3C show another embodiment of an integrated piston head that includes an integrated hydraulic motor and electric generator

FIGS. 13 and 13A show an embodiment of an integrated hydraulic pump/motor and electric motor/generator.

DETAILED DESCRIPTION

Figure 1:
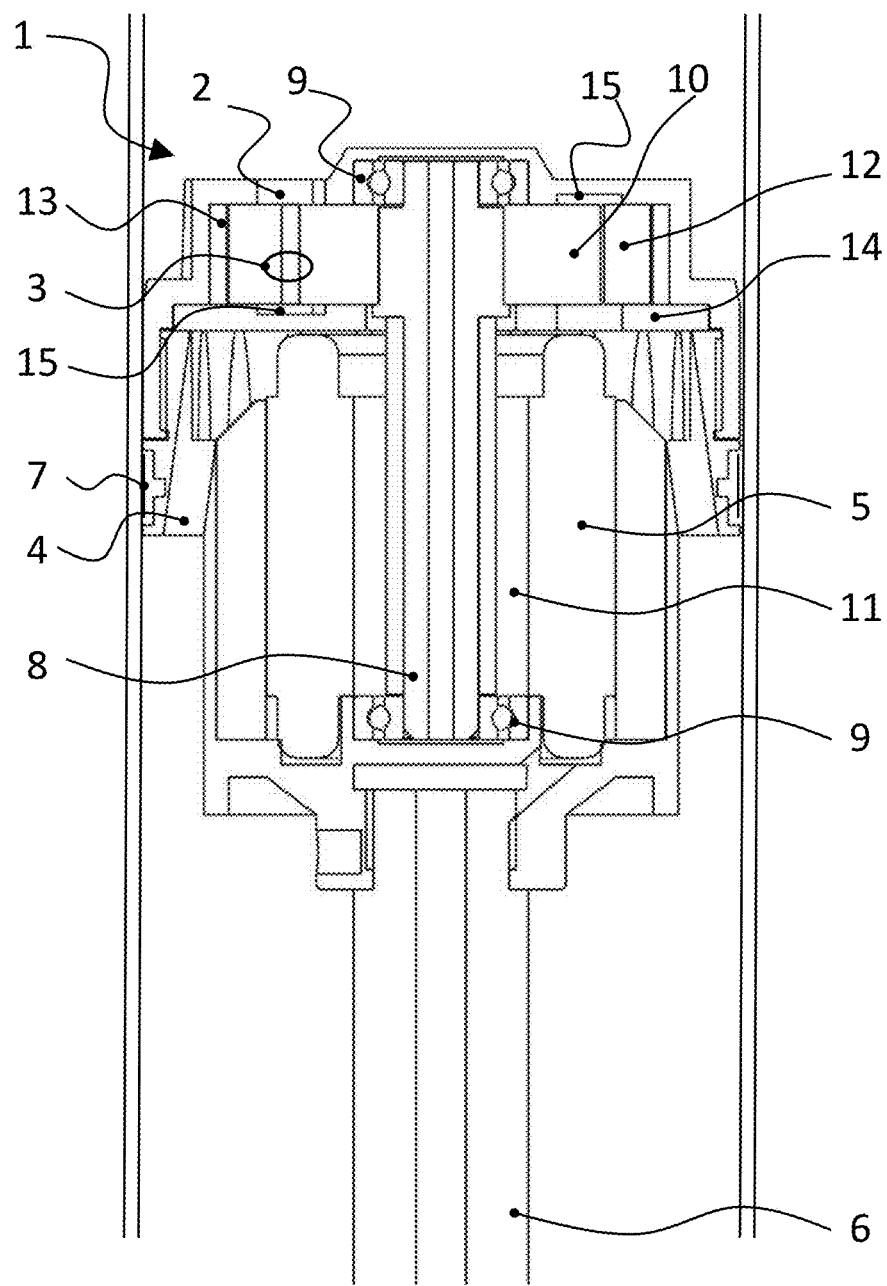
FIG. 1 is an embodiment of an integrated piston head (IPH) that includes a hydraulic motor and electric generator.

Some aspects of the system relate to an integrated energy generator that is capable of harnessing energy from high force but relatively low velocity movement, without the need for external fluid circuits which typically lower system efficiency, and introduce durability problems and added manufacturing costs. Several embodiments utilize traditional damper configurations and components, with improvements focused on integration of energy harvesting componentry and valving on the piston head and elsewhere in the housing. While "damper" is used in reference to the system, it should be noted that the invention is not limited to oscillatory systems nor is it merely an energy-extracting device, as it can be actuated as well. Embodiments of the described integrated energy generator may include a housing and a piston that moves at least partially through a compression stroke when compressed. The piston may additionally move at least partially through an extension stroke when extended (i.e., the piston may be double-acting). When the piston moves, hydraulic fluid is pressurized and moved to drive a hydraulic motor. The hydraulic motor drives an electric generator that produces electricity.

According to one aspect, a coupled hydraulic motor and electric generator are integrated into the piston head of a conventional damper. A traditional monotube configuration may be used with a gas-filled accumulator at the base of the damper. Alternatively, a twin tube design to with a selectively-valved accumulator configuration may be used with the integrated piston head. In another illustrative embodiment, the integrated piston head can be used with a double through-shaft damper design. However, use of the integrated piston head is not limited to these illustrative embodiments.

According to another aspect, a hydraulic motor is integrated into the piston head of a damper. The hydraulic motor has a shaft that extends through the piston rod to an electric generator on the opposing side of the piston rod. In this embodiment, the damper is otherwise configured similar to a traditional monotube. Alternatively, a twin-tube configuration with a compression bypass may be employed with this hydraulic motor and electric motor/generator configuration. In another illustrative embodiment, the opposed motor/generator system can be employed in a twin-tube design with a selectively-valved accumulator. However, use of the opposed hydraulic motor electric motor/generator system is not limited to these illustrative embodiments.

According to another aspect, a hydraulic motor and electric generator are integrated into the base valve of a damper. In one embodiment, a tri-tube rectified system is employed using check valves, a low pressure volume, and a high pressure volume. In another embodiment, a twin-tube design with an outer volume in communication with the extension volume may be used with the integrated base valve along with a selectively-valved accumulator. However, use of the base valve system is not limited to these illustrative embodiments.

Additional aspects relate to dynamically changing the kinematic characteristic of the energy generating damper. A control may be used to control the magnitude of force on the piston of the damper to desired levels. By way of example, according to one embodiment, a response can be controlled to mimic the force/velocity response (i.e., damping) of a conventional automotive damper, or in another example, one embodiment may include a response that can be controlled to maximize harvested energy from an ocean wave input. Some aspects relate to the controller powering itself from the energy generated by the energy generating damper. This may allow for wireless semi-active control or fully-active control.

Other aspects relate to energy generating dampers being assembled into the suspension system of a vehicle. The energy generating dampers may provide a primary source of damping in the suspension system. However, the invention is not limited in this regard and other applications may be utilized. For example, other aspects relate to energy generating dampers being assembled into an industrial energy harvesting platform, such as an ocean swell energy harvesting system.

Turn now to the figures, and initially FIG. 1, which shows an embodiment of an integrated piston head that includes a hydraulic motor and an electric generator. The integrated piston head 1 is disposed in a hydraulic cylinder with fluid both above and below the piston head. When fluid is pressurized above the piston head (with respect to fluid below), fluid flows into one or more inlet/outlet ports 2 above the piston head. In the embodiment of FIG. 1, a positive displacement gerotor 3 is utilized as a hydraulic motor, although the present invention(s) is not limited in this regard. When fluid flows through the inlet/outlet 2, a pressure differential forces the gerotor mechanism 3 to spin in its offset pocket. The gerotor motor 3 is drivingly connected to the generator shaft 8, which in turn is drivingly connected to an electric generator 5 immersed in the hydraulic fluid such that rotation of the hydraulic motor rotates the electric generator, and vice versa. Fluid flows from the inlet/outlet 2 through the hydraulic motor 3 and out the inlet/outlet port (or ports) 4 below the piston head. This spins the shaft 8, which spins the generator 5, which produces electricity. Electricity is carried via wires that are routed outside the piston head and damper housing through a hollow piston rod 6. A seal on the outer rim 7 of the piston head prevents fluid from bypassing the inlet/outlet ports by going around the piston head. When fluid is pressured below the piston head, fluid passes into the inlet/outlet port (or ports) 4 below the piston head, through the hydraulic motor, and out the inlet/outlet port (or ports) 2 above the piston head.

The generator shaft 8 is supported at either end by bearings 9 and the shaft 8 supports the inner gerotor element 10 and the rotor 11 of the electrical generator 5. The outer gerotor element 12 is supported by a journal bearing 13. A cover plate 14 axially locates the gerotor 3 in its pocket in the piston head. Shadow ports 15 may exist in both the piston head and the cover plate so as to keep the gerotor assembly in hydraulic axial balance.

Figure 2:
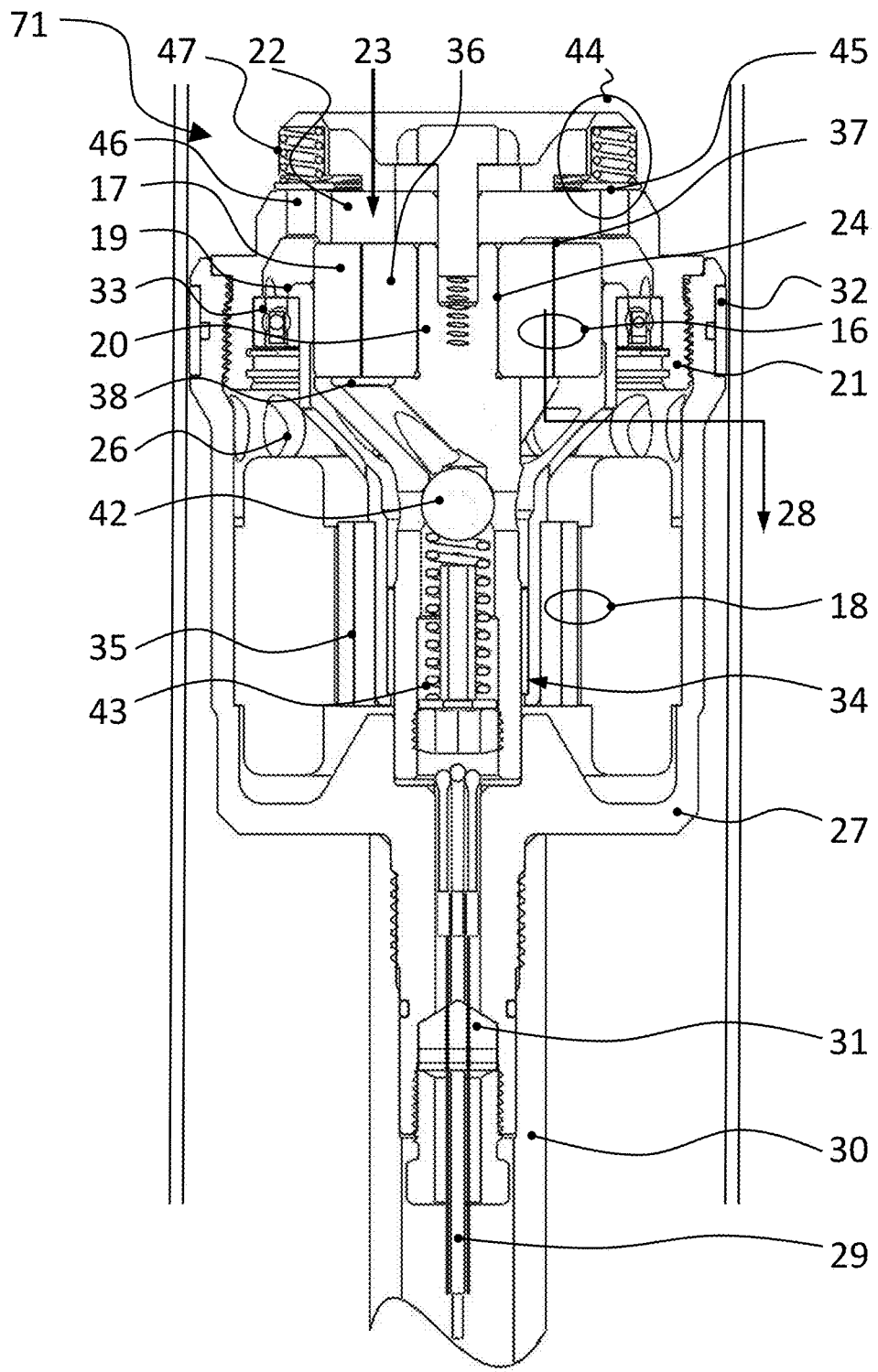
FIGS. 2, 2A and 2B show another embodiment of an alternate integrated piston head that includes a hydraulic motor and electric generator.

FIG. 2 shows an embodiment of an alternate integrated piston head to that as shown in FIG. 1. In this embodiment, a positive displacement gerotor 16 is utilized as a hydraulic motor and differs from the embodiment shown in FIG. 1 in the fact that the outer element 17 of the gerotor motor 16 is drivingly connected to the generator 18 via the generator shaft 19, and the inner element 36 of the gerotor motor 16 is free to rotate on an eccentric shaft 20. This arrangement allows the outer larger diameter element of the gerotor to share a common low friction bearing (such as a deep groove ball bearing or similar) with that of the generator shaft to and the smaller inner diameter of the inner element to run directly on its shaft.

In the application of a damper, the piston velocity, and hence the gerotor motor velocity, is continually accelerating/decelerating in one direction then stopping and then accelerating/decelerating in the opposite direction. Without being bound by theory, as the gerotor speed slows, any hydrodynamic lift generated on the plain bearing of the gerotor is lost, and higher friction on this bearing is applied. The larger the diameter of the this bearing the more torque is lost through this increased friction, and in the application when the gerotor is used as a motor, this torque loss may equal, or even be greater than, the torque generated by the motor itself, potentially causing the motor to stall. Even when there is sufficient speed at this plain bearing interface to generate hydrodynamic lift, and hence cause a significant reduction in friction, again without being bound by theory, energy lost at this interface is proportional to the diameter to the power of 4, therefore it may be desirable to keep the plain bearing diameter as small as possible in order to reduce energy losses. Utilizing the above unique bearing arrangement, the larger outer element is now supported by a low friction rolling element bearing that is also shared with the generator shaft, and the plain bearing interface is located on the small diameter of the inner element, offering the potential benefit of low initial startup torque and lower high speed power losses. Although low friction bearings are more expensive than plain hydrodynamic bearings, the fact the outer gerotor element shares the same low friction bearing as the generator shaft may mitigate any increase in cost.

By placing the low friction bearing over, or near, the axial centerline of the outer gerotor element, all, or nearly all, of the radial load generated by the outer gerotor element is passed to the low friction bearing; this may enable the use of a low cost plain bearing on the opposite end of the generator shaft. As shown in FIG. 2, the diameter of this plain bearing 34 can be reduced to a size significantly smaller than that of the outer gerotor element diameter to reduce its frictional loss.

In the embodiment shown in FIG. 2 the integrated piston head 21 is disposed in a hydraulic cylinder with fluid both above and below the piston head. When fluid is pressurized above the piston head (with respect to fluid below), fluid flows into one or more inlet/outlet ports 22 in the piston head 21, along flow path 23. When fluid flows through the inlet/outlet 22, a pressure differential forces the gerotor 16 to spin on the offset journal 24 of the gerotor shaft 20. The outer element 17 of the gerotor motor is drivingly connected to the generator shaft 19, which in turn is drivingly connected to an electric generator 18, (which is immersed in the to hydraulic fluid) such that rotation of the hydraulic motor rotates the electric generator, and vice versa. Fluid flows from the inlet/outlet 22 through the hydraulic motor 16 and through the inlet/outlet port (or ports) 25 in the gerotor shaft and through the passages 26 in the generator can 27 to below the piston head as shown by flow path arrow 28. This fluid flow spins the gerotor which in turn spins the generator shaft 19, which spins the generator 18, which produces electricity. In this embodiment, electricity is transmitted via wires 29 that are routed outside of the piston head and damper housing, through a hollow piston rod 30 that is connected to the generator can 27, via a high pressure hydraulic seal 31. A seal 32 on the outer rim of the piston head prevents fluid from bypassing the inlet/outlet ports by going around the piston head. When fluid is pressured below the piston head, fluid passes into the generator can 27 via the passages 26 and into the inlet/outlet port 25 in the gerotor shaft 20, through the hydraulic motor, and out the inlet/outlet port (or ports) 22 in the piston head.

The generator shaft 19 is supported at either end by bearings 33 and 34 with the shaft 19 supporting the outer gerotor element 17 and the rotor 35 of the electrical generator 18. The inner gerotor element 36 is supported via a journal bearing 24 on the gerotor shaft 20. The gerotor shaft also acts as a cover plate to axially locate the gerotor 16 between the gerotor shaft and the piston head 21. Shadow ports 37 and 38 in both the piston head and the gerotor shaft may be provided so as to keep the gerotor assembly in hydraulic axial balance.

Figure 2A:
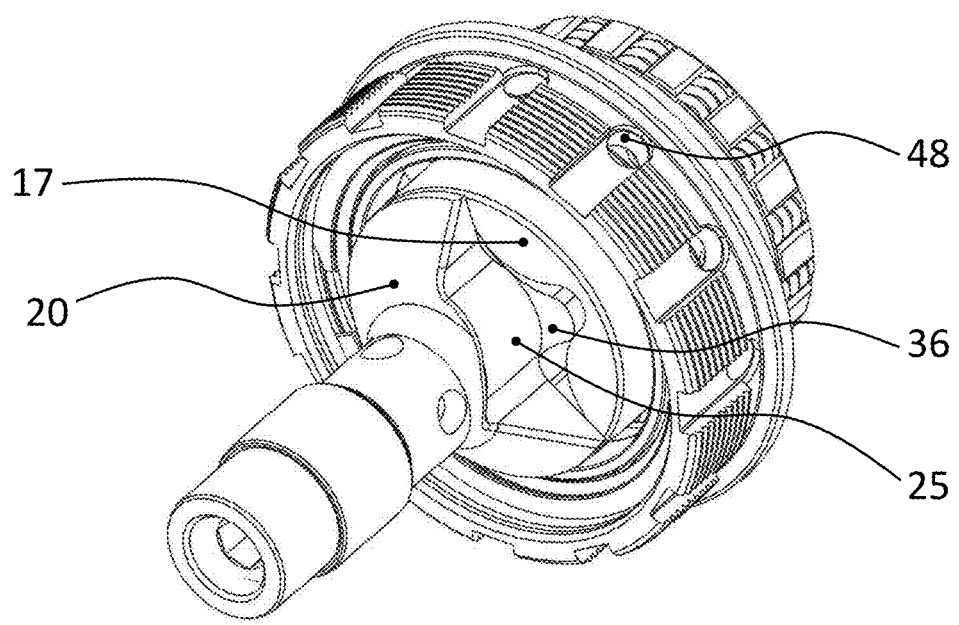

As shown in FIG. 2A, the port 25 in the gerotor shaft is open to the pressure in the generator can 27 and there is no outer sealing land around this port. Since there is pressure differential between the fluid in port 25 and the generator can 27 an outer sealing land is not necessary, and providing the gerotor with a reduced land contact may reduce the friction drag between the gerotor and the sealing face of the gerotor shaft. The opposing shadow port 37 that exists in the piston head is also open to the pressure in the generator can 27 and also has no outer sealing land around this shadow port. This not only helps keep the gerotor in axial hydraulic pressure balance, but it also means that as the fluid flows from the gerotor can into and out of the port 25, it will also flow via the shadow port 37. As the fluid flows into and out of the shadow port 37, it must pass through the rolling elements of the low friction bearing 33, thereby keeping the bearing running in a continually refreshed supply of fluid and minimizing any localized heating of the fluid due to friction losses.

Figure 2B:
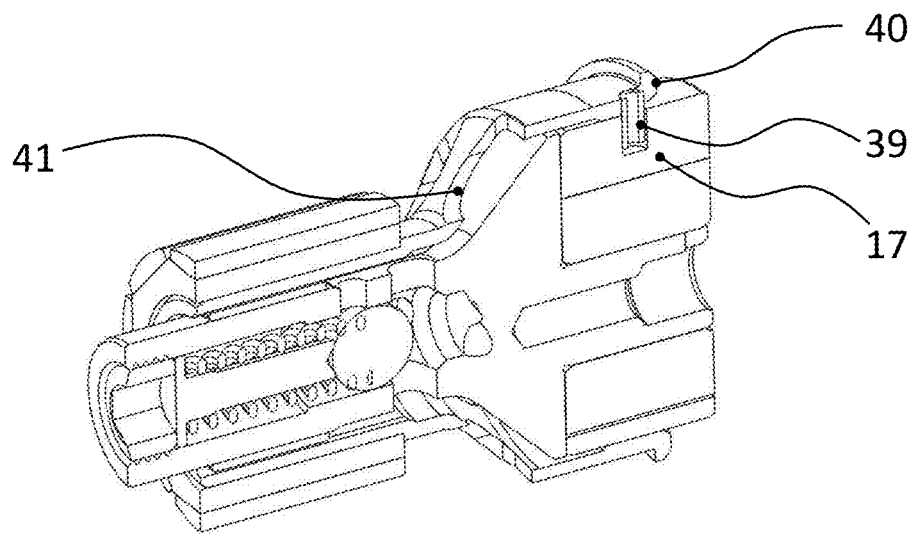

As shown in FIG. 2B, the outer gerotor element 17 is drivingly connected to the generator shaft via drive pins 39 that are secured into the outer element. These pins are to connected to the generator shaft via slots 40 that are disposed around the outer diameter of the generator shaft. In one embodiment these pins are of the split spring type and not only carry the driving torque from the gerotor to the generator shaft but act as small shock arrestors, absorbing the shock loads that are placed in the gerotor from the high frequency motion of the damper.

The generator shaft has passages 41 that allow the flow from the ports in the gerotor shaft to pass through the generator shaft into the generator can 27 and from there into the volume below the piston head.

Referring again to FIG. 2, the generator shaft contains a check valve 42 that allows for a free flow from the piston head through the gerotor, through the shadow port of the generator shaft, through the passages in the gerotor shaft into the generator can and from there into the volume below the piston head, by-passing the gerotor so that reduced damping (and reduced energy recovery) is achieved in the compression stroke. The check valve is actuated by a spring 43; the preload on the spring can be adjusted so that the compression damping can be varied from a minimum value to a maximum value, whereby maximum compression damping is achieved, to suit different applications. The check valve will not allow flow to by-pass the gerotor on extension stroke so that full extension damping (and energy recovery) may be achieved.

A blow-off valve 44, as shown in FIG. 2, may be employed to limit the maximum pressure in the generator can and hence the maximum pressure that exists on the bottom side of the integrated piston head (IPH). Pressure that exists in the generator can acts on a sealing washer 45 via passages 46. The sealing washer is held against the sealing face on the piston head by springs 47, blocking flow from the passages 46. Pressure acting over the area of the passages 46 generates a force to unseat the sealing washer, and once the force from the pressure in the generator can acting on the sealing washer overcomes the spring force from the springs 47, the sealing washer unseats and allows flow from the generator can and hence the underside of the IPH, to the top side of the IPH, via slots 48 in the piston head (shown in FIG. 2A), by-passing the gerotor. The spring force and the number of passages acting upon the sealing washer can be varied to change the pressure at which the blow-off valve opens, to suit different applications.

The blow-off valve is used to limit the pressure differential that exists across the gerotor under high extension strokes, so as to not only limit the maximum extension damping force, but to also limit the maximum speed of the gerotor. This will keep the gerotor bearings and generator speeds to reasonable limits under high extension forces, thereby increasing the to durability of the IPH.

Figure 3:
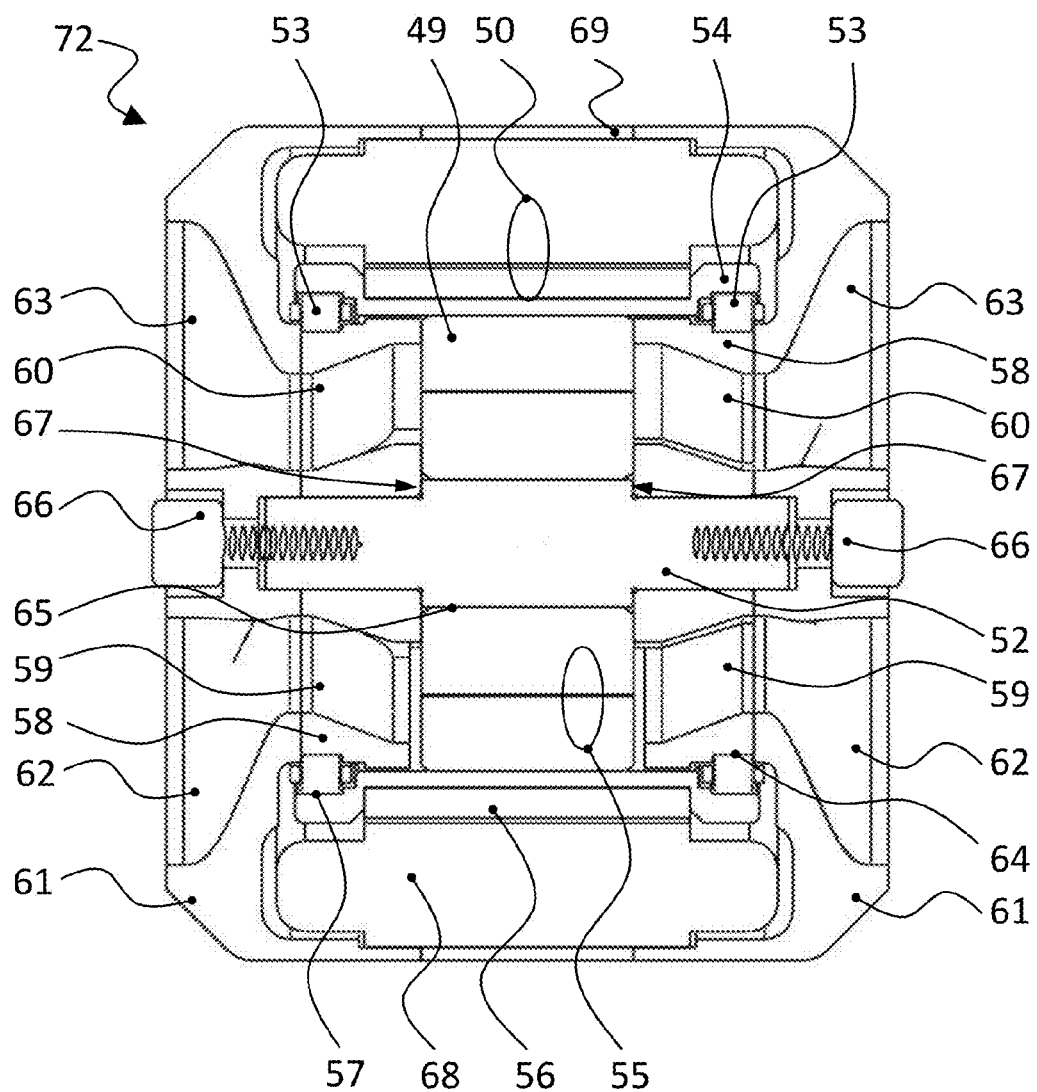

FIGS. 3, 3A, 3B and 3C show an embodiment of an Integrated Motor/generator Unit (IMGU) that incorporates the features of the embodiment shown in FIG. 2 but in a more compact unit with a reduced number of components. This embodiment can be used either in an IPH arrangement, as shown in FIG. 4A, or as an individual 'valve' that can be incorporated in a damper or actuator as will be discussed below with respect to FIG. 6. As in the previous embodiments, the IMGU may be used as a generator or as hydraulic power source for elector-hydraulic actuators.

In this embodiment, and as in the embodiment shown in FIG. 2, the outer element of the gerotor motor is drivingly connected to the generator 50 in a similar manner as shown in the embodiment shown in FIG. 2, the inner element 51 of the gerotor motor is free to rotate on an eccentric shaft 52. This arrangement allows the outer element of the gerotor to share common low friction bearings 53 with that of the generator shaft 54 and the smaller inner diameter of the inner gerotor element to run directly on the eccentric shaft 52, and offers the efficiency and cost benefits as outlined in the embodiment shown in FIG. 2. In the embodiment shown in FIG. 3, the generator 50 is now placed concentric and co-planar with the gerotor motor 55, as opposed to concentric and adjacent as shown in FIG. 2. This arrangement not only reduces the length and weight of the overall package it also reduces the number of components, thereby reducing cost whilst increasing durability. Magnets 56 of the generator are drivingly connected (via bonding or other suitable means) directly to the generator shaft 54 (as shown in FIG. 3B), or can be connected directly to the outer gerotor element 49, thereby eliminating a separate rotor component. Two low friction bearings 53 that support the generator shaft equally share the radial load from the outer gerotor element. As two bearings now equally share this load, substantial increase bearing life may be obtained, increasing the durability of the IMGU. In the embodiment shown, the outer bearing races 57 of the low friction bearings are formed directly into the generator shaft, eliminating the additional component of the outer race, whilst reducing the mass of the IMGU and the rotating inertia of the generator rotating assembly.

Gerotor caps 58 are positioned on either side of the gerotor elements and contain a first flow port 59 and a second flow port 60; these ports may be full flow or shadow ports as required by the application, and are such that the gerotor assembly is placed in axial hydraulic balance. The port configuration can be symmetrical about both the vertical and horizontal centerlines. The gerotor caps are connected and secured to the IMGU end caps 61. Flow passages 62 and 63 to contained in the IMGU end caps connect to the first and second flow ports in the gerotor caps, so that as fluid flows from the one port to the other, rotation of the gerotor occurs.

By incorporating a symmetric layout of the porting arrangement, it is possible for the flow path in and out of the hydraulic unit to be on the same side on the IMGU or on opposite sides, thereby increasing the flexibility of use for different applications. This symmetrical part configuration also allows for additional valves and connections, such as by-pass valves pressure relief valves, accumulators etc. to be positioned opposite the first and second flow ports, allowing for flow to occur through the gerotor as well as around the gerotor (i.e. to and from the first and second ports), offering a parallel flow path to the hydraulic unit. Again this may offer favorable packing configurations.

By positioning the gerotor motor 55 coplanar with the generator, flow in and out of the hydraulic unit via the first and second ports now occurs through the center of the generator, as opposed to around or adjacent to the generator, as shown in the embodiments of FIG. 1 and FIG. 2. This shortens and simplifies the flow paths, reducing viscous losses, thereby increasing the efficiency of the unit.

Additional valves, such as pressure relief valves, by-pass valves, load holding valves etc. can be incorporated into the gerotor caps and or the IMGU end caps (or even external to the IMGU end caps) to provide additional functionality, both as a generator and as an actuator.

The inner races 64 of the low friction bearings are formed directly into the gerotor caps (or into the IMGU end caps) and are axially retained between the gerotor cap and the IMGU end cap. This further reduces the parts count by eliminating the need for a separate bearing inner race. In the embodiment shown the low friction bearings are of the cylindrical roller type, of course the bearing arrangement shown can be easily changed to incorporate other types of low friction bearings, or even plain bearings, as the application warrants, as the particular application is not limited in this regard.

In the embodiment shown in FIG. 3, the eccentric shaft 52 is held stationary to the gerotor caps and the inner gerotor element rotates relative to the shaft supported by a plain journal bearing 65. The eccentric shaft is used to connect and locate the gerotor caps and the IMGU end caps, and the IMGU assembly is secured via a threaded connection 66, or other arrangement such as swaging and welding. Shoulders 67 on the eccentric shaft ensure an accurate spacing between the gerotor caps is achieved, so that the correct axial clearance is maintained between the gerotor and the end caps, for proper and efficient operation of the gerotor.

The stator 68 of the generator is drivingly connected to the outer sleeve 69 (via bonding or other suitable arrangement), and the outer sleeve is sandwiched between the two IMGU end caps so that the stator is held concentric and in correct axial location with the generator shaft. A timing feature between the two IMGU end caps and the outer sleeve radially locates the IMGU end caps with respect to each other, to ensure correct timing of the flow ports and positioning of the eccentric shaft 52.

Because of the compact nature of the Integrated Motor/generator Unit as shown in this embodiment, it is possible for the IMGU to be used as a cartridge type regenerative valve, whereby the unit is placed in a machined bore or pocket of a device so that flow ports are aligned and sealed against the first and second ports of the IMGU. Flow can then be controlled in a hydraulic circuit by controlling the back EMF of the generator, or the IMGU can act as a hydraulic power source by supplying electrical power to the generator to spin the hydraulic unit so that it acts as a pump. Possible uses of this kind of valve could be as a pressure regulator or relief valve for larger hydraulic circuits. Normally, hydraulic valves with controllable orifices are used for pressure regulation in hydraulic circuits, and as such energy is wasted by throttling flow across these orifices. By incorporating the IMGU as a regenerative pressure control valve this energy can now be captured.

Other applications include variable hydraulic power sources, such as for engine or transmission lubrication pumps. Ordinarily these pumps are of fixed displacement and driven at a certain shaft speed. These pumps are sized so as to meet the maximum expected flow demand at any given shaft speed, and as such these pumps supply more flow than is normally required, and energy is wasted through the use of flow control valves. Because of the compact size and cylindrical shape of the IMGU, it can be used to replace these pumps as a simple cartridge unit inserted into a machined cavity in the engine, transmission etc. or as an externally mounted unit. Because of the variable speed control and hence flow control capability of the IMGU, the output of the pump can be precisely matched to the demand at all times, thereby reducing the energy consumption in these applications.

Figure 4:
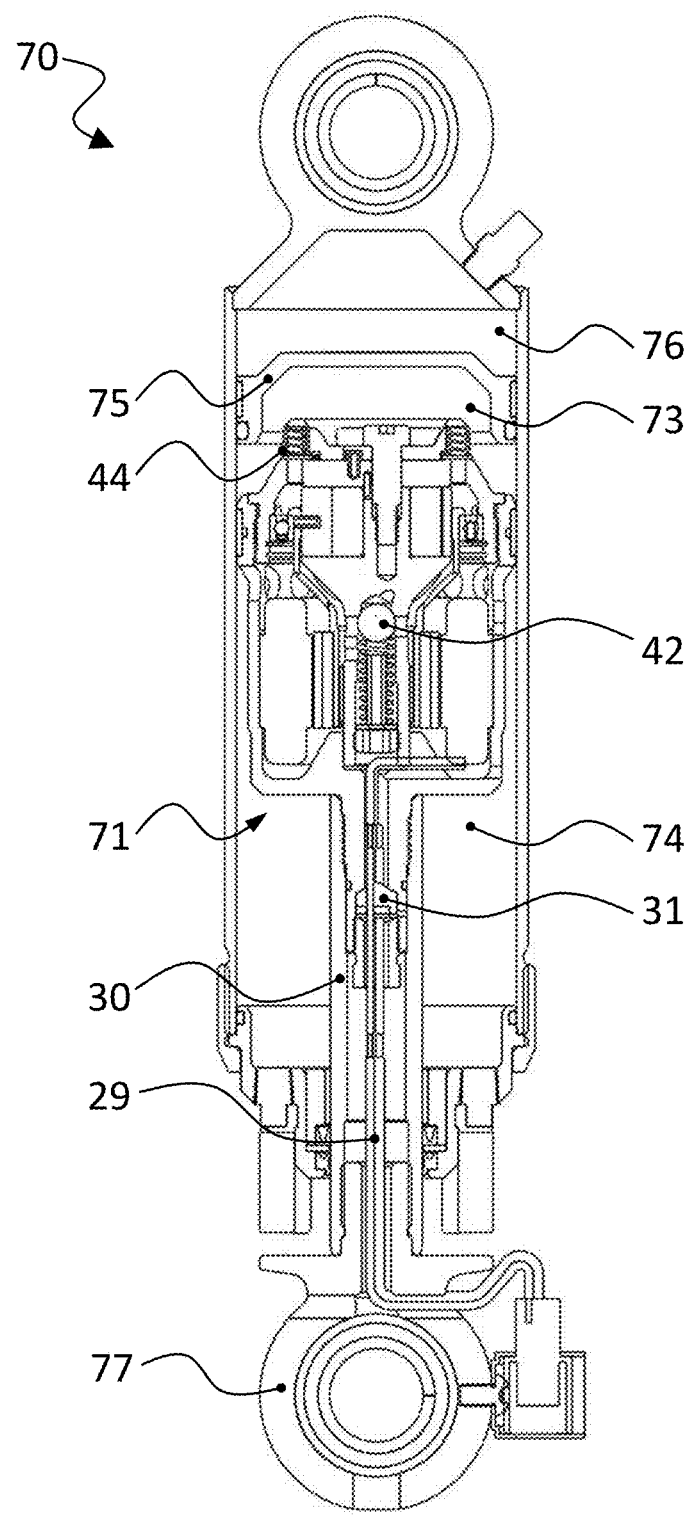
FIGS. 4 and 4A, show an embodiment of a mono-tube damper including an IPH
Figure 4A:
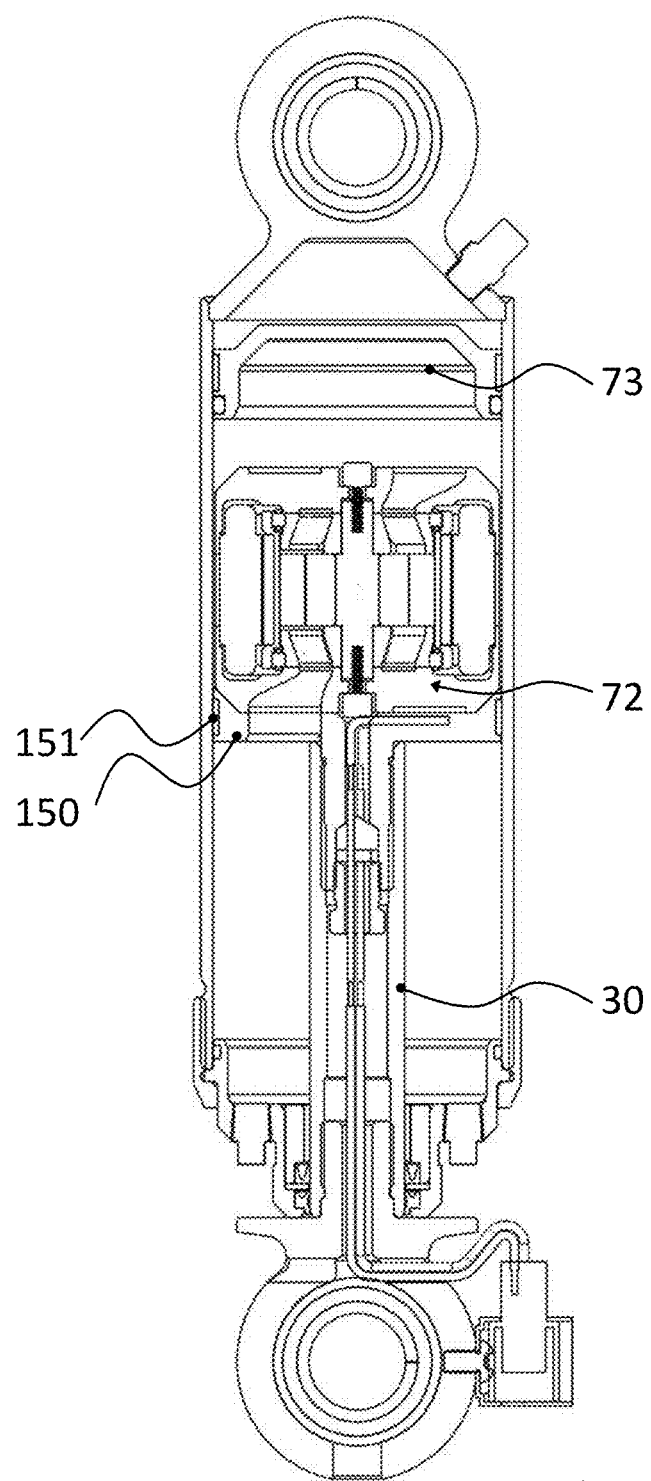

FIGS. 4 and 4A shows an embodiment of a monotube damper 10 that utilizes the integrated piston head 1 of FIG. 2 and FIG. 3 respectively, however, the IPH could also be of the configuration as shown in FIG. 1. Here, the integrated piston head 71 is disposed in a housing that includes a compression volume 73 and an extension volume 74. Additionally, a floating to piston 75 seals a gas-filled accumulator 76 and maintains pressure on the fluid inside the housing. When the piston rod 30 undergoes jounce, fluid flows from the compression volume 73, through the integrated piston head 71, and into the extension volume 74. During the jounce stroke, the floating piston 75 moves to compress the gas in order to compensate for the volume of the piston rod introduced into the extension volume 74. During rebound, fluid flows from the extension volume 74, through the integrated piston head 71, and into the compression volume 73. Simultaneously, the floating piston 75 moves to expand the accumulator gas volume 76 to compensate for the piston rod volume leaving the housing during rebound.

When fluid flows through the integrated piston head 71, the hydraulic motor spins, which turns the electric generator. This generates electricity from the movement of the fluid forced through the piston head 71 by the movement of the piston 30. The energy from the electric generator is transmitted via wires 29 that exit the IPH, through the hollow piston rod 30, and exit outside the damper housing at the end of the piston rod via the rod end 77. High pressure pass-throughs 31 may be used to seal the portion of wires that are immersed in hydraulic fluid with the electric generator from wire portions that exit the piston rod to the outside environment.

By altering the electrical characteristics of the electric generator, the kinematic characteristics of the damper can be altered. If the load is increased on the electric generator by applying lower impedance on the terminals, the force/velocity characteristic of the generator will be increased (greater force per angular velocity). Since the hydraulic motor and electric generator are coupled, this is translated to the hydraulic motor and therefore the fluid path through the integrated piston head. The linear relationship results in an increased force/velocity characteristic on the damper piston when lower impedance is applied to the generator, and a decreased force/velocity characteristic on the damper piston when higher impedance is applied to the generator.

Likewise, the electric generator can be driven as a motor, and the hydraulic motor can be utilized as a hydraulic pump. This allows for actuation of the damper, creating an active linear actuator. An example of such usage, using the embodiment of FIG. 4 as an illustrative example, is to drive the electric motor/generator 18 by applying a voltage. By way of example, a brushed DC motor may be used as the generator and a gerotor pump may be used as the hydraulic motor, however, the present invention(s) is not limited in this regard. When voltage is applied to the electric generator 18, the hydraulic motor mechanism will spin, forcing fluid from either the compression volume 73 to the extension volume 74, or vice-versa, depending on direction of spin (which is governed by voltage polarity for a DC motor/generator). The movement of fluid from one volume to the other forces the piston head to move, actuating the piston rod. In some applications, this may be useful as an active suspension system in vehicles to allow for controllable placement of the wheels for improved ride comfort and terrain traversal characteristics. In some industrial applications, this may be useful as a stand-alone, sealed hydraulic actuator with a high power density characteristic.

In one embodiment, the gas in the accumulator 76 should be pressurized so as to ensure the maximal compression (jounce) damping does not exceed the force applied by the accumulator 76 on the compression volume 73. In one embodiment, the pressure is typically in the 200-800 psi range, however, an appropriate value can be calculated as follows: accumulator pressure>max jounce damping force/floating piston surface area.

Figure 6:
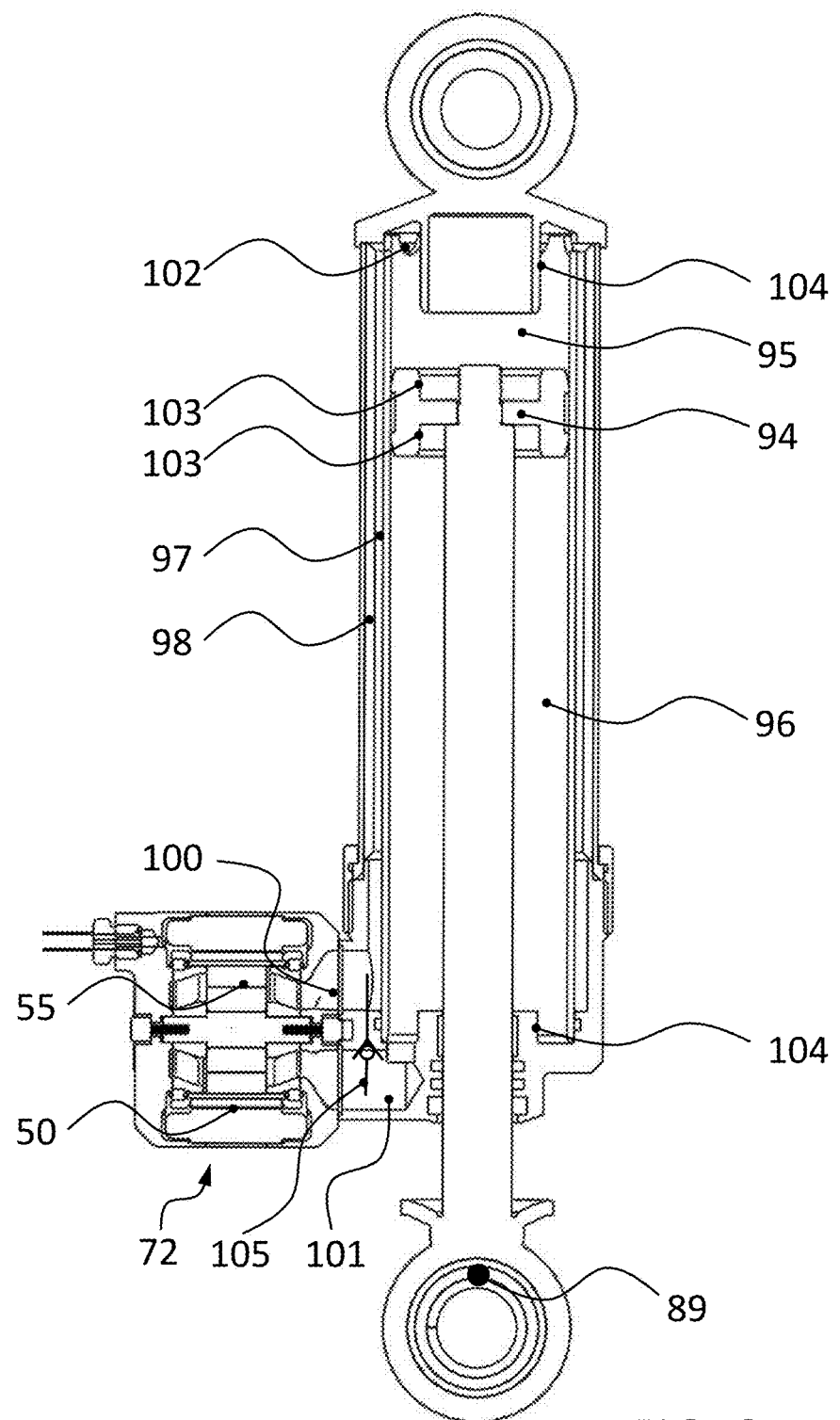
FIG. 6 is an embodiment of integrated energy-recovering twin-tube damper with a hydraulic motor electric motor/generator side valve.

The embodiment of FIG. 4A shows a monotube damper of the arrangement shown in FIG. 4 whereby the IPH 71 is of the embodiment as shown in FIG. 3. Here, the IPH 72 is connected to a piston head 150 that is connected to the piston rod 30. The seal 151 is contained in the piston adaptor, thereby allowing the IPH 72 to be common with other damper arrangements, as shown in FIG. 6 for example. It is of course possible for the seal to be housed directly in the IPH 71, and the IPH to be connected directly to the piston rod 30.

Some embodiments of the described monotube damper incorporating an integrated piston head 1 include additional features. Applications such as vehicle dampers sometimes require minimal damping during jounce. In order to reduce the damping during jounce compared to the fluid path through the hydraulic motor, a check valve "bypass" 42 may be incorporated in the integrated piston head (or elsewhere) such that fluid may flow from the compression volume to the extension volume via the bypass valve, but not vice-versa. Additionally, other valving such as non-directional valves, bypasses and blow-off valves 44 may be used to further tune ride characteristics.

Figure 5:
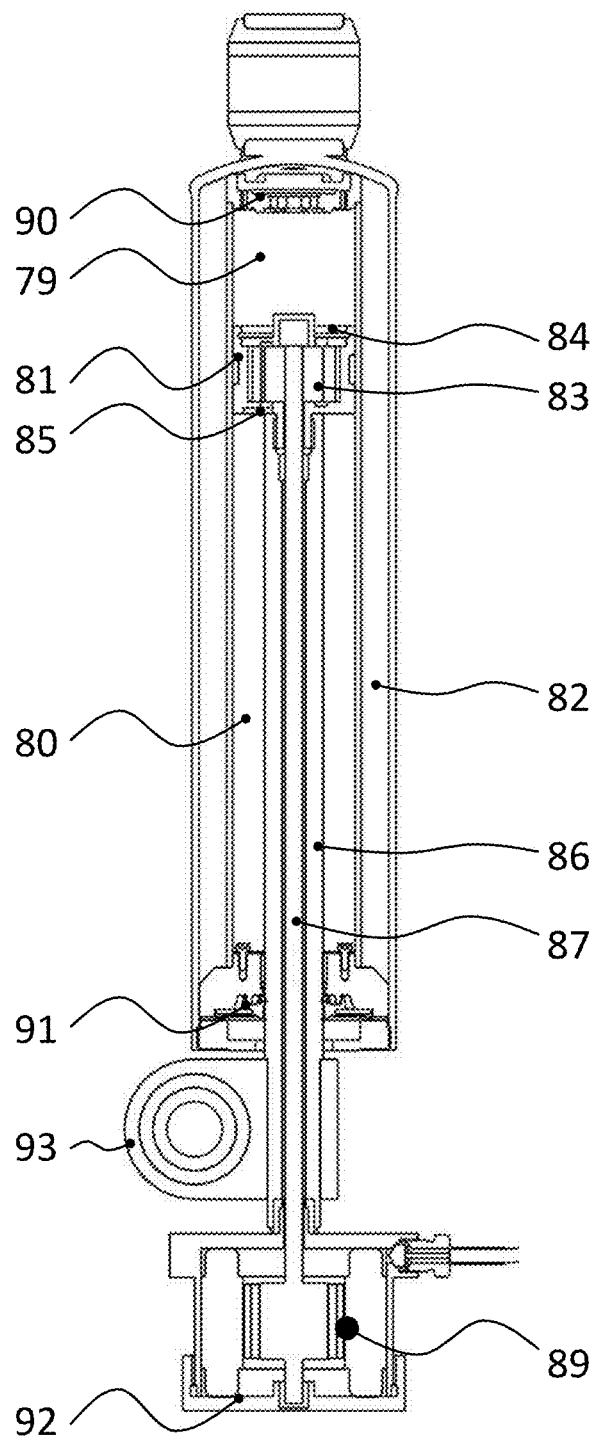
FIG. 5 is an integrated energy-recovering twin-tube damper embodiment with piston rod opposed hydraulic motor and electric generator.

In some cases it is desirable to eliminate the gas-filled accumulator and operate the system at low-pressure to minimize the possibility of fluid leakage through the shaft seals. Additionally, it may be desirable to locate the electric generator off of the piston head (e.g. to allow for a larger motor without compromising piston stroke to housing length ratio). FIG. 5 demonstrates one embodiment of an integrated energy-generating damper that is operated at low pressure, locates the electric generator off the piston head, and features a compression bypass.

The twin-tube damper embodiment of FIG. 5 has a piston head 81 disposed in an inner housing that includes a compression volume 79 and an extension volume 80. In a first mode, the piston 81 moves through at least a portion of a jounce stroke to pressurize hydraulic fluid in the compression volume 79. In a second mode, the piston moves at least partially through a rebound stroke to pressurize hydraulic fluid in the extension volume 80. An outer tube concentric to the inner tube contains the low-pressure volume 82. The low-pressure volume 82 contains both fluid and a compressible medium (such as gas, foam or bladder). The piston head 81 disposed in the inner housing contains an integrated hydraulic motor 83 that includes a first port 84 and a second port 85. The first port 84 is in fluid communication with the compression volume 79 and the second port 85 is in fluid communication with the extension volume 80. The piston rod 86 is hollow and contains a shaft 87 that connects the hydraulic motor 83 on the piston head 81 with an electric motor/generator 89 on the other end of the piston rod 86. Rotation of the hydraulic motor 83 causes rotation of the electric motor/generator 89.

In the embodiment of FIG. 5, rebound damping is provided by the electric motor/generator 89 and delivered via the shaft 87 inside the piston-rod 86. The resistive force on the shaft 87 is delivered to the hydraulic motor 83 to restrict fluid flow between the compression volume 79 and the extension volume 80. As discussed previously, the kinematic characteristic of the damper can be altered by varying the electrical characteristics on the terminals of the electric motor/generator. In addition, the system can be actively driven by supplying power to the electric motor/generator.

Valves 90, 91 restrict flow into and out of the low-pressure volume 82 such that during jounce fluid flows from the compression volume 79, through the unrestrictive open valve 90, and freely flows through the low-pressure volume 82, through the check valve 91 into the extension volume 80. During rebound, the check valve 91 closes, forcing fluid from the extension volume 80 to go through the piston head 81, while a small amount of fluid to replace exiting piston rod volume flows from the low-pressure volume 82, through the open valve 90, into the compression volume 79.

In the twin-tube embodiment of FIG. 5, during jounce, pressurized fluid in the compression volume 79 flows through the open valve 90, into the low-pressure volume 82, and exits the check valve 91 to the extension volume 80. In this embodiment, the volume of fluid entering the open valve 90 is greater than that exiting the check valve 91, and this volume differential is stored in the low-pressure volume by compressing the compressible medium therein. In addition to this fluid path, some fluid may pass from the compression volume 79, through the piston head 81, into the extension volume 80, generating electricity in the generator 89 while doing so.

During rebound, the embodiment of FIG. 5 will pressurize fluid in the extension volume 80, thereby closing the check valve 91. Fluid is forced to flow from the extension volume 80, through the piston head 81, into the compression volume 79. Simultaneously, stored fluid in the low-pressure volume 82 will flow through the open valve 90 into the compression volume 79 to replace piston rod volume as the compressible medium in the low-pressure volume 82 expands. As fluid flows from the compression volume 80, through the porting 85, into the hydraulic motor 83, out from the porting 84, into the extension volume 79, the hydraulic motor 83, spins. This spins the shaft 87 that runs inside the piston rod 86 and the motor/generator 89 so that this fluid flow generates back electromotive force (EMF) from the motor/generator to provide damping.

In the embodiment shown in FIG. 5, an offset loop 93 is used to attach the piston rod 86 to the vehicle, however, any suitable attachment method may be employed such as loop connectors or threaded piston rod mounts. In the system of FIG. 5, the electric generator is placed above the mount point for the piston rod. Several embodiments allow for this. In one embodiment, the shaft 87 passes through a shaft seal that separates a fluid-contained side of the shaft from an open-air side of the shaft. In one instance, this allows a keyed shaft 87 to insert into the electric generator can 92 which can thread onto the piston rod, acting as the primary mount apparatus for the piston rod end of the damper. In another embodiment, an offset loop adapter is used on the top and bottom to allow a bolt-on attachment without side-loading the damper. Here, there entire length of shaft 87 and the generator 92 can be enclosed in fluid during production, eliminating the need for a pressure shaft seal for field installation. In another embodiment, an adapter can be attached to the piston rod to allow for either an eyelet mount point or a piston rod nut mount attachment method without the need for threading on the generator can during installation. Again, this allows for the elimination of a friction-causing shaft seal on the motor shaft 87. Several attachment methods for the piston rod end of the damper were presented, however, the present invention is not limited in this regard.

FIG. 6 demonstrates another embodiment of an integrated energy-generating damper that is operated at low pressure, locates the electric generator off the piston head, and features a compression bypass, similar to that shown in FIG. 5, differing in the fact that the to motor/generator is not disposed on the opposite end of the piston rod from the piston head, but positioned perpendicular to the cylinder body. This arrangement offers the benefit of shorter overall shock length, as well as eliminating the need for long thin concentric shafts. This arrangement may be more suitable for vehicular damper applications where shock length and packaging requirements are constrained.

The twin-tube damper embodiment of FIG. 6 includes a piston 94 disposed in an inner housing that includes a compression volume 95 and an extension volume 96. In a first mode, the piston 94 moves through at least a portion of a jounce stroke to pressurize hydraulic fluid in the compression volume 95. In a second mode, the piston moves at least partially through a rebound stroke to pressurize hydraulic fluid in the extension volume 96. An outer tube concentric to the inner tube contains the low-pressure volume 97. The low-pressure volume 97 contains both fluid and a compressible medium 98 (such as gas, foam or bladder). An integrated motor/generator unit (IMGU) 72 is located at the rod end of the damper. The IMGU shown in FIG. 6 is similar to that as shown in FIG. 3, but it may be similar to that as shown in FIG. 1 or FIG. 2, and includes a first port 100 and a second port 101. The first port 100 is in fluid communication with the low pressure volume 97 and the second port 101 is in fluid communication with the extension volume 96.

A valve 102 restricts flow into and out of the low-pressure volume 97 such that during jounce fluid flows from the compression volume 95, through the valve 102, and into the low-pressure volume 97. The valve 102 offers the required flow resistance in this direction so as to give the appropriate jounce damping characteristics for the application. During rebound, the valve 102 allows for free flow from the low-pressure volume 97 into the compression volume 95.

In the twin-tube embodiment of FIG. 6, during jounce, pressurized fluid in the compression volume 95 flows through the valve 102, into the low-pressure volume 97, into the IMGU 72 through port 100, exiting the IMGU through port 101 and into the extension volume 96. In this embodiment, the volume of fluid exiting the compression volume 95 is greater than that entering the extension volume 96 and this volume differential is stored in the low-pressure volume 97 by compressing the compressible medium 98 therein. During rebound, the embodiment of FIG. 6 will pressurize fluid in the extension volume 96 forcing flow from the extension volume 96, through the IMGU 72 via ports 101 and 102, into the low pressure volume 97, through the open valve 102 into the compression volume 95. Simultaneously, stored fluid in to the low-pressure volume 97 will also flow through the open valve 102 into the compression volume 95 to replace piston rod volume, as the compressible medium 98 in the low-pressure volume 97 expands. As fluid flows from the extension volume 96, through the porting 101 into the IMGU 72, and out of the IMGU from the porting 100 back into the compression volume 96, the hydraulic motor 55 and generator 50, spins. This generates back electromotive force (EMF) from the motor/generator to provide damping and produces electricity as described in FIG. 2. As discussed previously, the kinematic characteristic of the damper can be altered by varying the electrical characteristics on the terminals of the electric motor/generator. In addition, the system can be actively driven by supplying power to the electric motor/generator.

In the embodiment shown in FIG. 6 during jounce, fluid that flows from the compression volume 95 through the valve 102 into the low-pressure volume 97 then flows into the IMGU 72 through port 100, exiting the IMGU through port 101 and then into the extension volume 96. The fluid that flows through the IMGU during the jounce stroke will cause the motor 55 and generator 50 to spin, and although no back EMF will be produced, because of the low jounce damping forces required, the parasitic losses from the fluid flow and the rotating parts may cause too high a jounce damping force for certain applications. In these applications, it is possible to incorporate a bypass check valve 105 that will communicate the low pressure volume 97 to the compression volume 96. The check valve will allow the fluid to free flow directly from the low pressure volume 97 to the compression volume 96, thereby reducing the jounce damping force, but will not allow flow to bypass the IMGU during rebound damping.

In the embodiment shown in FIG. 6 there is a volume of oil that becomes trapped between the pockets 103 of the piston 94 and the journals 104 of the end caps during the last portion of both the jounce and rebound strokes. When the piston 94 is stroked so that the journal 104 enters the pocket 103 (in either jounce or rebound strokes) the hydraulic fluid that is trapped in the pocket 103 is forced to flow out of the annular gap that is formed between the journal outside diameter and the pocked inside diameter. The annular gap is sized so that a pressure spike is produced acting over the pocket area producing an additional force to provide a hydraulic buffer at the end of both the jounce and rebound strokes. The clearance between the pockets 103 and the journal 104 can be selected so as to produce the correct amount of buffering to suit the application.

In some use scenarios, it is desirable to have an energy-generating damper that is not gas-pressure limited in compression damping, features energy capture in both compression and to rebound, and maximizes stroke length per body length. Several embodiments that will now be described that incorporate the above features.

Figure 7:
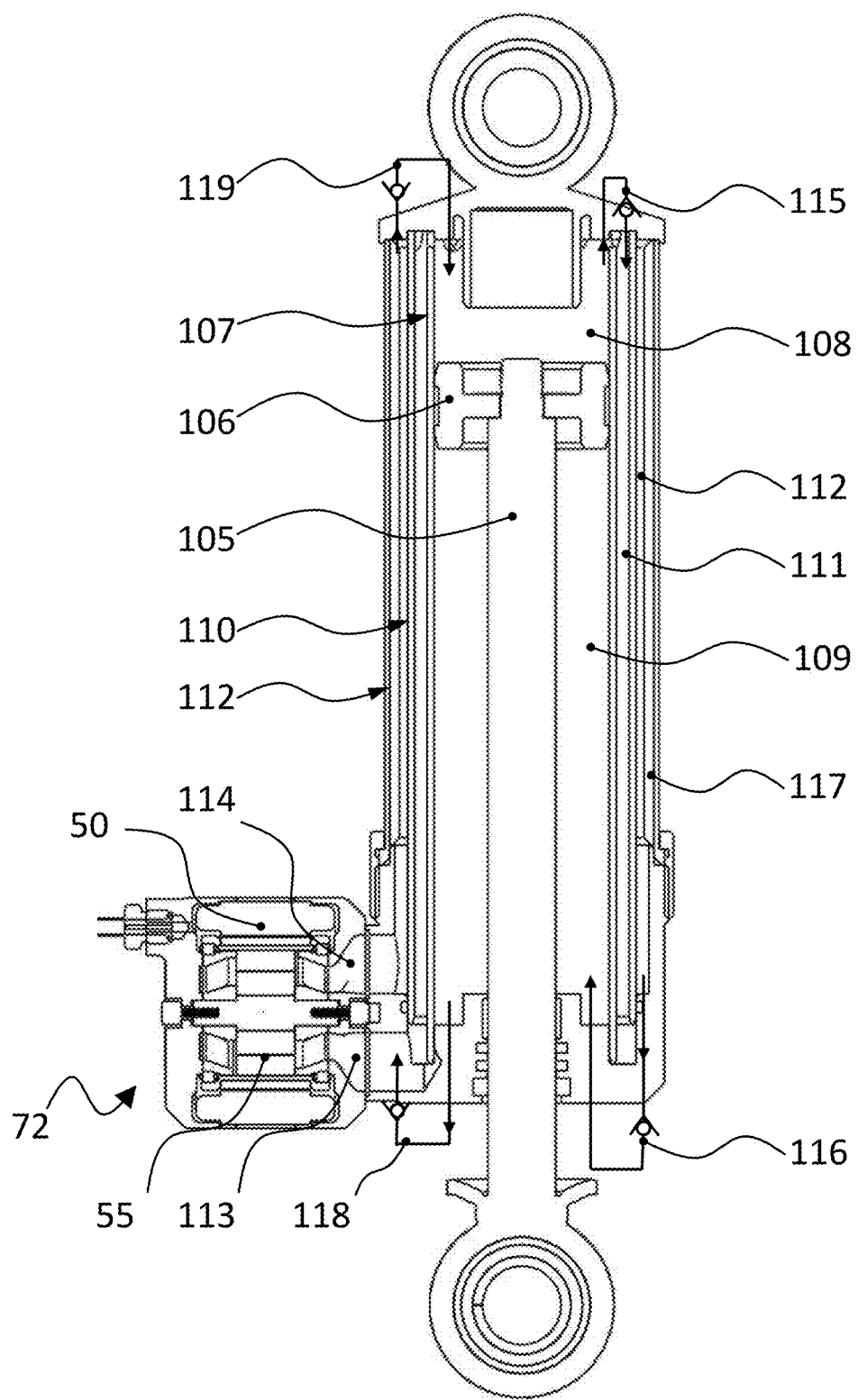
FIG. 7 is an embodiment of an integrated energy-recovering tri-tube damper with a hydraulic motor electric motor/generator side valve base valve.

According to the embodiment shown in FIG. 7, a tri-tube damper design that incorporates an energy-harvesting IMGU is disclosed. In this embodiment, a piston rod 105 and hydraulic-ram type (solid) piston 106 are disposed in an inner fluid-filled cylinder 107. The inner housing (collectively, the compression volume 108 and the extension volume 109) is surrounded by a second tube 110 that is concentric to the inner tube 107. The space between the inner tube and the second tube contains the high-pressure volume 111. The second tube 110 is surrounded by a third tube 112 that is concentric to the second tube. The space between the second tube and the third tube contains the low-pressure volume 112. In some embodiments the high-pressure and low-pressure tubes may be reversed.

In the embodiment of FIG. 7, an integrated motor/generator unit (IMGU) 72 is located at the rod end of the damper. The IMGU shown in FIG. 7 is similar to that as shown in FIG. 3, alternatively, it may be similar to that as shown in FIG. 1 or FIG. 2, and includes a first port 113 and a second port 114. The first port 113 is in fluid communication with the high-pressure volume 111 and the second port 114 is in fluid communication with the low-pressure volume 112.

During jounce, the piston rod 105 pushes the piston 106 into the compression volume 108, this forces fluid to pass from the compression volume into the high pressure volume 111 via a directional check valve 115. The high pressure volume 111 is in fluid communication with the first port 113 of the IMGU 72. Fluid passes from the high pressure volume 111, through the first port 113, through the IMGU 72, and out the second port 114, into the low pressure volume 112, through a directional check valve 116, and into the extension volume 109. Simultaneously, a compressible medium 117 such as foam cell, or bladder, in the low-pressure volume 112 compresses to displace introduced piston rod volume.

During rebound, the piston rod 105 pulls the piston 106 into the extension volume 109, this forces fluid to pass from the extension volume into the high pressure volume 111 via a directional check valve 118. The high pressure volume 111 is in fluid communication with the first port 113 of the IMGU 72. Fluid passes from the high pressure volume 111, through the first port 113, through the IMGU 72, and out the second port 114, into the low pressure volume 112, through a directional check valve 119, and into the compression volume 108. Simultaneously, the compressible medium 117 in the low-pressure volume 112 decompresses to replace extracted piston rod volume.

As fluid flows from the high pressure volume 111, through the porting 113 into the IMGU 72, and out of the IMGU from the porting 114 back into the low pressure volume 112, the hydraulic motor 55 and generator 50 rotate. This generates back electromotive force (EMF) from the motor/generator to provide damping and produces electricity as described in the embodiment of FIG. 2. As discussed previously, the kinematic characteristic of the damper can be altered by varying the electrical characteristics on the terminals of the electric motor/generator. In addition, the system can be actively driven by supplying power to the electric motor/generator.

Figure 8:
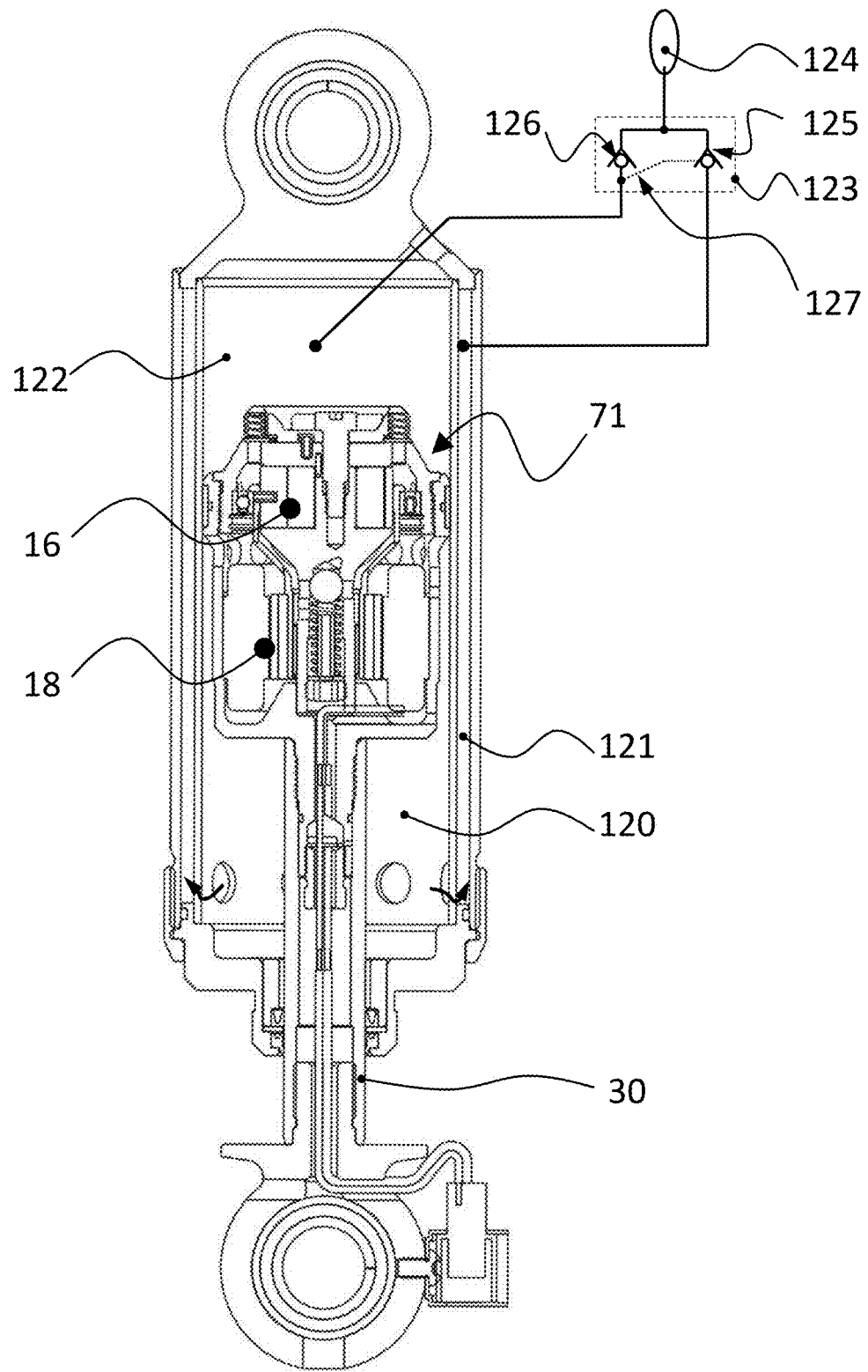
FIG. 8 is a twin tube IPH embodiment, schematically showing the accumulator connected to the low pressure volume.

According to another embodiment, FIG. 8 shows a twin-tube design that is not gas-pressure limited, featuring bidirectional energy capture, and having a high stroke to body length ratio. This system utilizes the integrated piston head of FIG. 2 (although this could also be the IPH as shown in FIG. 1 or 3), in a twin-tube body design with the use of a valve mechanism that operates to ensure that whichever port is at low pressure is always connected to the accumulator. Pilot operated valves such as check valves or a three port pilot operated spool valve may accomplish this operation. A shuttle valve can also ensure that the gas accumulator 124 on the common port is always in fluid communication with the low-pressure side of the piston head.

In the embodiment shown in FIG. 8, an integrated piston head 71 is disposed in an inner cylinder containing hydraulic fluid. The extension volume 120 of the inner cylinder is in fluid communication with an outer fluid volume 121 which is housed between the inner cylinder and a concentric outer cylinder. Both the compression volume 122 and the outer fluid volume 121 are in fluid connection with a pilot-operated valve block 123. A gas-filled accumulator, or reservoir, 124 is also in fluid connection with the pilot-operated valve block 123.

During jounce, the piston rod 30 is pushed into the cylinder, forcing fluid from the compression volume 122 through the hydraulic motor 16, which spins an electric motor/generator 18, and passes into the extension volume 120. Electricity from the electric generator passes down wires that go through the center of the piston rod 30. High-pressure wire pass-throughs seal the fluid portion of the internal shock body from the outside. Since the jounce stroke introduces piston rod volume into the extension volume, fluid needs to be displaced from the extension volume to an accumulator 124, which occurs via a valve block 123. When the compression volume becomes pressurized, a pilot operated check valve 125 is opened in the valve block 123 via the pilot line 127. This allows free flow to and from the accumulator 124 to the extension volume 120, thereby allowing the introduced rod volume to flow from the extension volume into the accumulator 124.

During rebound, the piston rod 30 is pulled out of the cylinder, forcing fluid from the extension volume 120 through the hydraulic motor 16, which spins an electric motor/generator 18, and passes into the compression volume 122. Since the rebound stroke extracts piston rod volume from the compression volume, fluid needs to be displaced from the accumulator 124, which occurs via a valve block 123. As the rod volume will need to be replaced into the compression volume from the accumulator, the pressure in the compression volume will be lower than that of the accumulator, this will allow for fluid to flow from the accumulator 124 through the check valve 126 into the compression volume 122.

In the embodiment shown, the valve block 123 comprises of a check valve 126 and a pilot operated check valve 125 to ensure that whichever port of the IPH is at low pressure is always connected to the accumulator, however, this can also be achieved using other valving arrangements such as a spool valve mechanism that can switch the connection of the accumulator 124 between the compression volume 122 and the extension volume 120 so that the accumulator is always in fluid communication with the lower pressure volume. In this embodiment, during jounce the pressure in the compression volume 122 is greater than the pressure in the extension volume 120, an internal pilot port in the valve block 123, connected to the compression volume 122 pushes the shuttle mechanism such that fluid can communicate between the accumulator 124 and the extension volume 120. During rebound, the pressure in the extension volume 120 is greater than the pressure in the compression volume 122, an internal pilot port in the valve block 123 connected to the extension volume 120 pushes the shuttle mechanism such that fluid can communicate between the accumulator 124 and the compression volume 122. Shuttle valve mechanisms, other pilot-operated valves, and valves that selectively connect different fluid volumes based on pressure differentials (including mechanical and electrically actuated valves) are well known in the art, and are not limited in the present invention(s).

While the hydraulic motor 16 and electric motor/generator 18 are shown in an integrated piston head 71 configuration, the embodiment of FIG. 8 can also be constructed with the piston head, piston rod, and electric motor/generator configuration of FIG. 5, where the piston head contains a hydraulic motor, the piston rod contains an internal spinning shaft, and the electric motor/generator is on the opposing side of the piston rod. In another embodiment, the system of FIG. 8 can be constructed with a solid piston head and a hydraulic motor and generator pair that sits at the base of, and external to, the damper such as the system disclosed in FIG. 6. Here, the first port of the hydraulic motor would be in fluid communication with the compression volume 122 and second port would be in fluid communication with the extension volume 120 (via the outer fluid volume 121). The rest of the system including the valve block 123 may remain as shown in FIG. 8.

Figure 9:
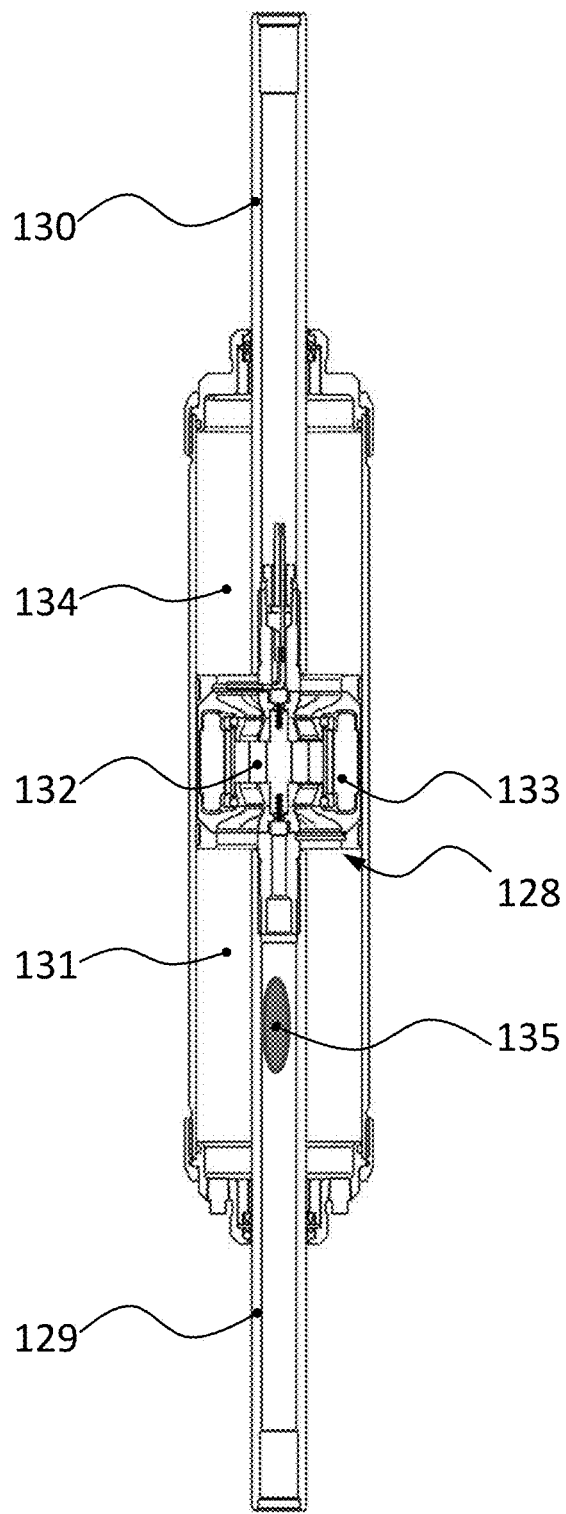
FIG. 9 is a monotube integrated piston head embodiment that utilizes a through-shaft design.

Certain industrial applications of a sealed hydraulic linear energy generator allow for alternative form factors than typical automotive dampers. In the embodiment of FIG. 9, a through-shaft integrated piston head system is demonstrated. In this embodiment, an integrated piston head 128 is disposed in a cylinder containing hydraulic fluid connected to a first piston rod 129 and a second piston rod 130. The piston head as shown in FIG. 9 is similar to that as shown in FIG. 3, but it may be similar to that as shown in FIG. 1 or FIG. 2. In some embodiments the second piston rod 130 exiting the device may be connected to a spring mechanism in order to return the other piston rod to a normally compressed state.

During piston rod travel in a first direction, fluid from the first volume 131 is forced to flow through the hydraulic motor 132, which spins an electric motor/generator 133, and passes into the second volume 134. Electricity from the electric generator passes down wires that go through the center of one of the piston rods where high-pressure wire pass-throughs seal the fluid portion of the internal shock body from the outside.

During piston rod travel in a second direction, fluid from the second volume 134 is forced to flow through the hydraulic motor 132, which spins an electric motor/generator 133, and passes into the first volume 131.

Internal to the system is a device to displace fluid to compensate for fluid volume changes due to temperature fluctuations. In the embodiment of FIG. 9, this is shown to be compressible foam cell inserted into a crevice 135 in one of the piston rods 134. However, placement of the fluid compensation mechanism may be in another location internal to the unit or external. Additionally, an accumulator, among other devices, can be used as a replacement or in addition to foam in order to displace fluid. In some embodiments, it may be desirable to limit to pressure the fluid compensation mechanism encounters. In these embodiments, a shuttle valve may be employed as described in FIG. 8.

Figure 10:
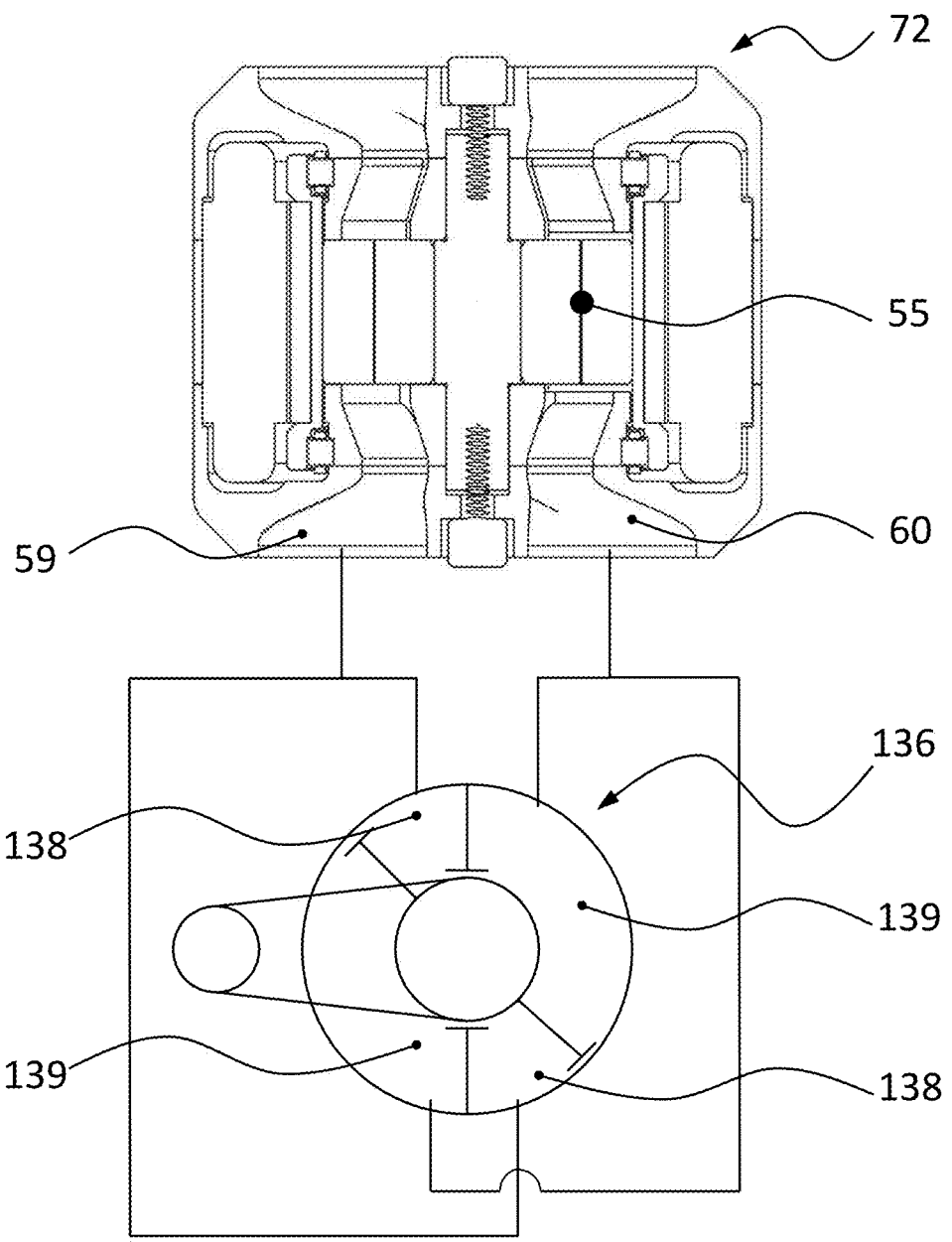
FIG. 10 is an integrated energy-recovering rotary embodiment with an external integrated hydraulic motor.

In certain applications, such as heavy duty military vehicles, it is desirable to have an energy harvesting rotary damper. The embodiment of FIG. 10 demonstrates such as system whereby an Integrated Motor/generator Unit (IMGU) is connected to a rotary damper unit 136. In the embodiment shown the IMGU 72 is similar to that as shown in FIG. 3, but it may be similar to that as shown in FIG. 1 or FIG. 2. During the damper lever stroke in a first direction, fluid from the first volume(s) 138 is forced to flow into the first port 59 through the hydraulic motor 55 and out through the second port 60 into the second volume(s) 139. As fluid flows through the motor 55 the motor and generator spins and generates electricity, as described in FIG. 7. During the damper lever stroke in a second direction, fluid from the second volume(s) 139 is forced to flow into the second port 60 through the hydraulic motor 55 and out through the first port 59 into the first volume(s) 138. As fluid flows through the motor 55, the motor and generator spins and generates electricity, as described in FIG. 7. A device to displace fluid to compensate for fluid volume changes due to temperature fluctuations maybe incorporated either internally or externally by way of a compressible foam cell or an accumulator, among other devices.

In the embodiment shown the IMGU is shown as an external device to the rotary damper, however, the IMGU can be easily integrated into rotary damper mechanism, thereby reducing the overall package size and eliminating external hydraulic connections.

Other rotary damper configurations may be employed and it may be possible to incorporate the energy harvesting IPH or IMGU into these devices as the present invention is not limited in this regard.

Certain industrial applications of electro hydraulic linear actuator offer the ability to capture energy in the opposite direction to their actuation, such as in lifting equipment where a mass is being raised and then lowered. In the embodiments shown in FIG. 11 and FIG. 11A, a twin-tube energy harvesting electro hydraulic linear actuator that is capable of capturing energy in the compression stroke and power actuation in the extension stroke is presented.

Figures 11, 11A:
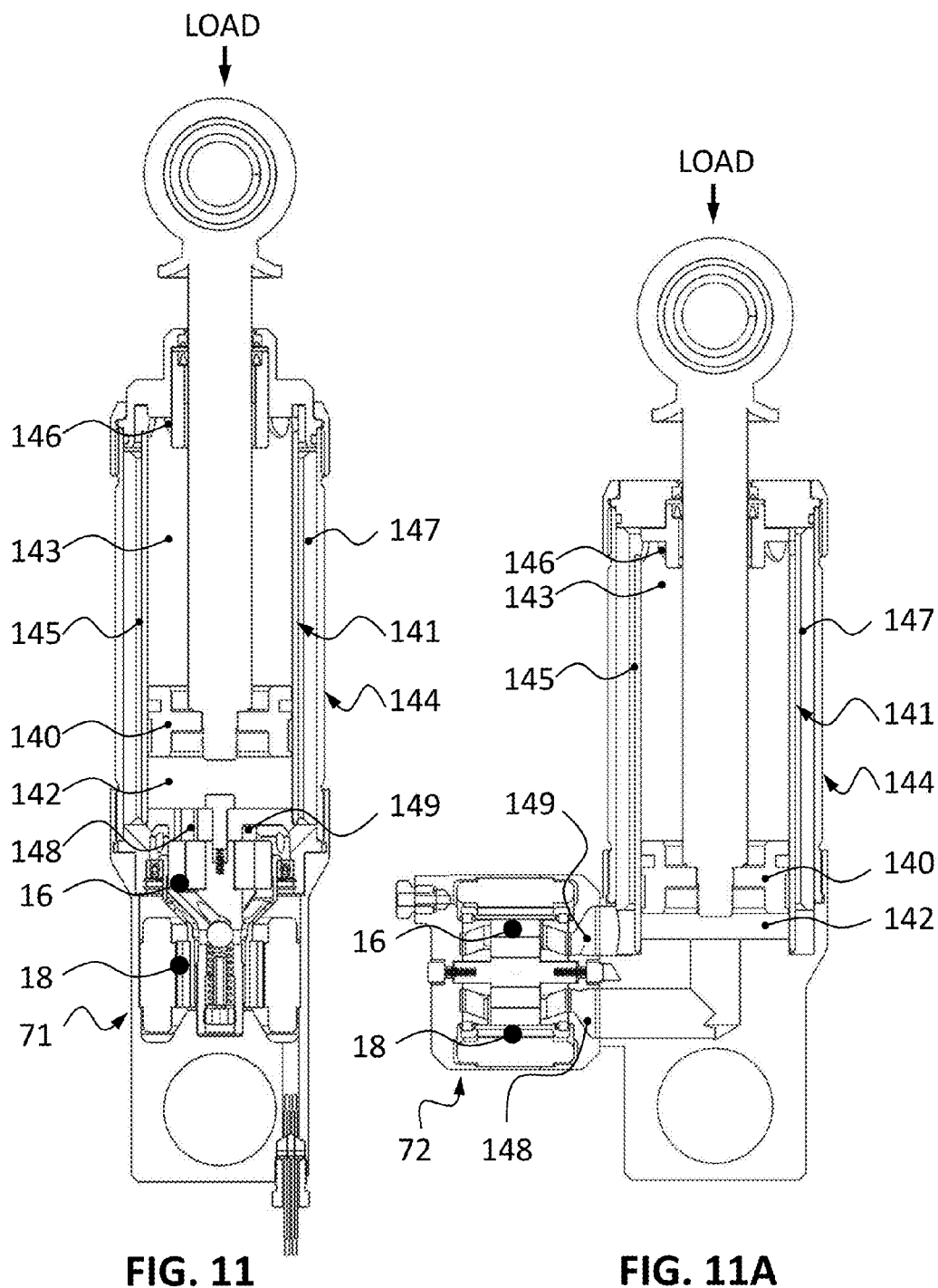
FIGS. 11 and 11A, show an embodiment of an integrated energy-recovering electro-hydraulic actuator.

In the embodiment shown in FIG. 11 the IPH valve is placed at the base of the actuator concentric with the actuator, it is possible to locate the IPH valve at the base of the actuator body, but perpendicular to the axis of the actuator as shown in the embodiment shown in FIG. 11A, (the IPH valve may also be placed at the base of the actuator body, but parallel to the to actuator axis). This may offer packaging benefits in certain applications where actuator length is critical.

The twin-tube embodiments of FIG. 11 and FIG. 11A have a piston 140 disposed in an inner housing 141 that includes a compression volume 142 and an extension volume 143. In a first mode, the compression volume 142 is pressurized and moves the piston 140 through at least a portion of an extension stroke to overcome a force. In a second mode, the piston moves at least partially through a compression stroke to pressurize hydraulic fluid in the compression volume 142 from a force. An outer tube 144 concentric to the inner tube 141 contains a low-pressure volume 145 that is in fluid communication with the extension volume via passages 146. The low-pressure volume 145 contains both fluid and a compressible medium 147 (such as gas, foam or bladder). An integrated piston head (IPH) assembly 71 (72 in FIG. 11A) is located at the base of the actuator. The IPH assembly may be similar to that as shown in FIG. 1, FIG. 2 or FIG. 3, and includes a first port 148 and a second port 149. The first port 148 is in fluid communication with the compression volume 142 and the second port 149 is in fluid communication with the low pressure volume 145. In the twin-tube embodiment of FIG. 11 and FIG. 11A, during extension, power is supplied to the electric motor/generator 18 causing it and the hydraulic motor 16 to spin, this causes fluid to flow from the hydraulic motor via port 148 into the compression volume 142. This generates pressure in the compression volume so as to generate a force on the piston 140 overcoming the force present on the piston rod, causing the piston to extend. As the piston extends, fluid is displaced from the extension volume 143 and flows through the low pressure chamber 145, through the second port 149 and into the low pressure side of the hydraulic motor 16. In this embodiment, the volume of fluid entering the compression volume 142 is smaller than that exiting the extension volume 143 and this volume differential is taken from the stored volume in the low-pressure volume 145 by expanding the compressible medium 147 therein.

A load holding valve (such as a check valve) may be placed between the first port 148 and the compression volume 142 to eliminate leakage through the hydraulic motor when the actuator is under load holding operation. This will prevent the piston from retracting under load holding causing a safety hazard. The load holding valve might be of the pilot operated, electronically activated or mechanically activated type, these valves are well known in the art and the patent is not limited in this regard.

In this embodiment, retraction of the piston may be accomplished in two ways, in the to first mode, where there exists an external load on the piston rod (when the actuator is used in lowering a payload for example); the piston will want to retract under this force. If a load holding valve is used then the piston will not retract until this valve is activated to allow fluid flow from the compression volume 142 to the first port 148. Once this valve is activated (via electronic, mechanical means etc.), then fluid will flow from the compression volume 142 to the first port 148, due to the load place upon the piston rod, and will cause the motor 16 to spin. This will cause the generator 18 to spin generating back electromotive force (EMF) from the motor/generator to provide resistance to this flow, and producing electricity as described in FIG. 2. A controller may provide varying impedance to the electric generator, thereby controlling rate at which the fluid flows from the compression volume to the first port, offering a controllable and safe manner in which to lower the payload.

In the second mode where there is no payload acting on the actuator, the piston is retracted by supplying power to the electric motor/generator 18 causing the electric motor/generator 18 and the hydraulic motor 16 to spin, this causes fluid to flow from the from the compression volume 142 to the first port 148, pressurizing the low pressure volume 145 and the extension volume 143, thereby retracting the piston 140. Although this will require the low pressure volume to become pressurized, the load to retract the piston in this application will be very low, as it will need to only overcome friction of the actuator and any accompanying mechanism, and as such the pressure attained in the low pressure volume will be within the limits of the compressible medium contained therein. If a load holding valve is utilized as described above, then actuation of this valve will first have to take place before the piston is retracted.

During retraction of the piston, fluid will flow from the compression volume 142 into the first port 148, through the motor 16, into the low pressure volume 145, via the second port 149, and into the extension volume 143. In the embodiment shown, the volume displaced by the compression volume is greater than that entering the extension volume and this volume differential is stored in the low-pressure volume 145 by compressing the compressible medium 147 therein.

Certain applications of the energy harvesting electro hydraulic linear actuator as shown in the embodiment of FIGS. 11 and 11A, may require the addition of other valves such as pressure relief valves, thermal relief valves etc. and the incorporation of these valves are well to known in the art of this type of actuator and the patent is not limited in this regard.

Figure 12:
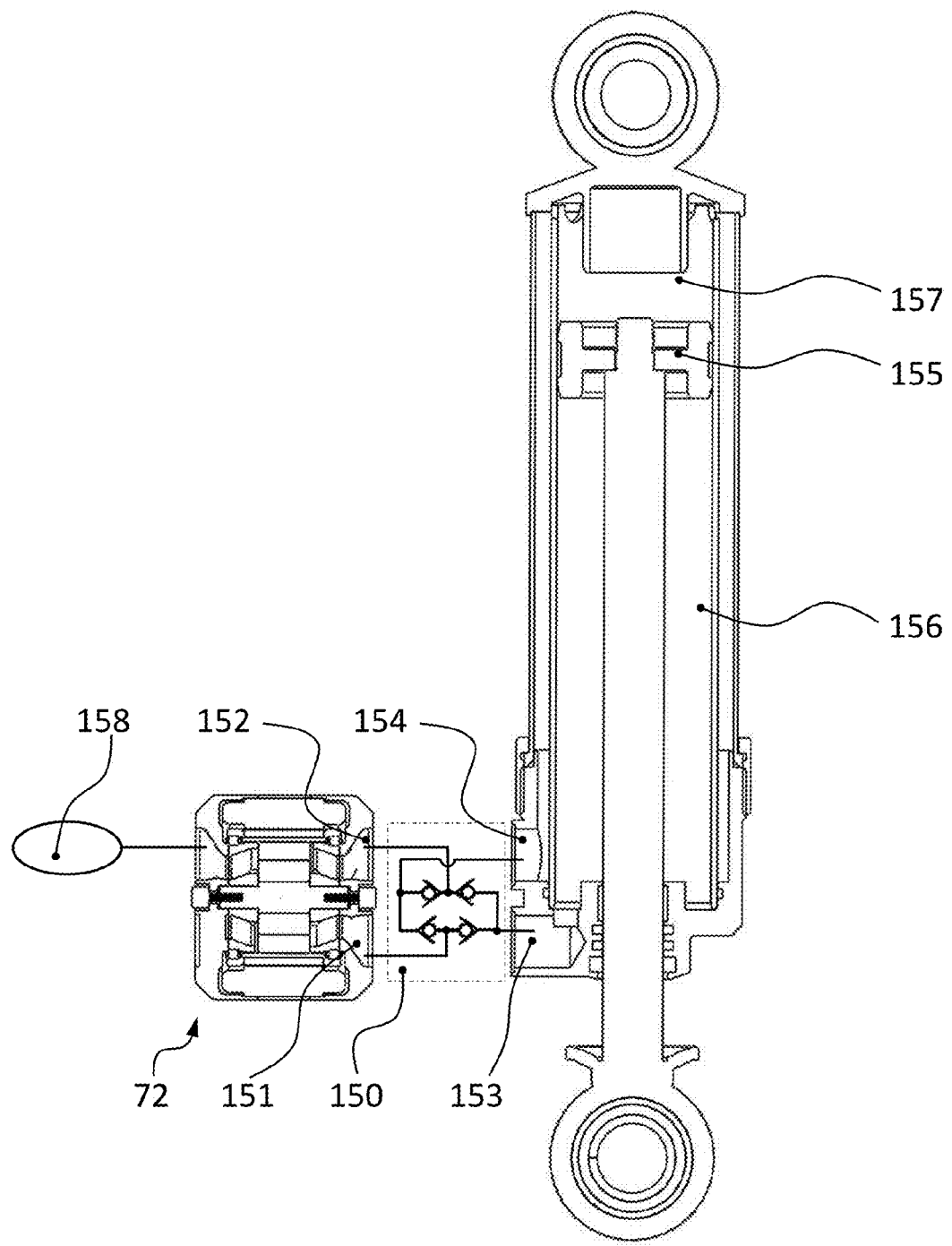
FIG. 12 is an embodiment of an energy harvesting actuator that will generate a constant direction of rotation of the motor/generator regardless of the direction of stroke of the actuator.

In certain energy harvesting applications, it may be advantageous to keep the motor/generator assembly rotating in the same direction regardless of stroke direction. For these applications it is possible to connect the motor/generator assembly to the actuator (be it a linear or rotary type) via a rectifying valve circuit. In the embodiment shown in FIG. 12 an energy harvesting linear actuator that is connected to an integrated motor/generator assembly via a rectifying valve circuit is presented. In the embodiment shown the rectifying valve circuit 150 is in the form of four check valves, however, the same functionality can of course be achieved by the use of a pilot operated spool valve(s) or the like, and the patent is not limited in this regard.

In the embodiment shown, the integrated motor/generator assembly is similar to that as shown in FIG. 3, but it may be similar to that as shown in FIG. 1 or FIG. 2, and includes a first port 151 and a second port 152. The first port 151 is in fluid communication with the discharge side of the rectifying circuit and the second port 152 is in fluid communication return side of the rectifying circuit. In the embodiment shown the linear actuator is in the form of a twin tube architecture which has a first port 153 that is in fluid connection with the extension side of the actuator and a second port 154 is in fluid connection with the compression side. A piston 155 disposed in an inner housing that includes an extension volume 156 and a compression volume 157. In a first mode, the piston 155 moves through at least a portion of an extension stroke to pressurize hydraulic fluid in the extension volume 156. In a second mode, the piston moves at least partially through a compression stroke to pressurize hydraulic fluid in the compression volume 157. An outer tube concentric to the inner tube connects the compression volume 157 to the second port 154.

The rectifying circuit is configured so that fluid that is discharged from the first port of the actuator during an extension stroke or the second port during a compression stroke will always be diverted to the discharge side of the rectifying circuit and into the first port of the IMGU 72, and fluid discharged from the second port 152 of the IMGU will always be diverted to the first port 153 of the actuator during a compression stroke or the second port 154 during an extension stroke. This will ensure that the direction of rotation of the motor/generator will remain constant regardless of whether the actuator is extended or retracted under load.

An accumulator or reservoir 158 is connected to the second port 152 of the IMGU 72 to accommodate the difference in volume from the extension and compression strokes. In the to embodiment shown the reservoir is connected to the symmetrical port opposite the second port 152, although this could be connected anywhere along the return line of the rectifying circuit.

One issue with using a rectifier circuit with the energy harvesting actuator is the fact that the motor/generator cannot back drive the actuator, and the motor/generator can 'freewheel' under certain inertial conditions. This can be overcome however by replacing the check valves (or spool valves) with pilot operated valves (that are either electrically, or mechanically operated), and then sequencing the valves so that the discharge from the hydraulic motor via first port 151 is in fluid connection with the first port 153 of the actuator as the second port 152 of the hydraulic motor is in fluid connection with the second port 154 and vice versa.

Figure 13:
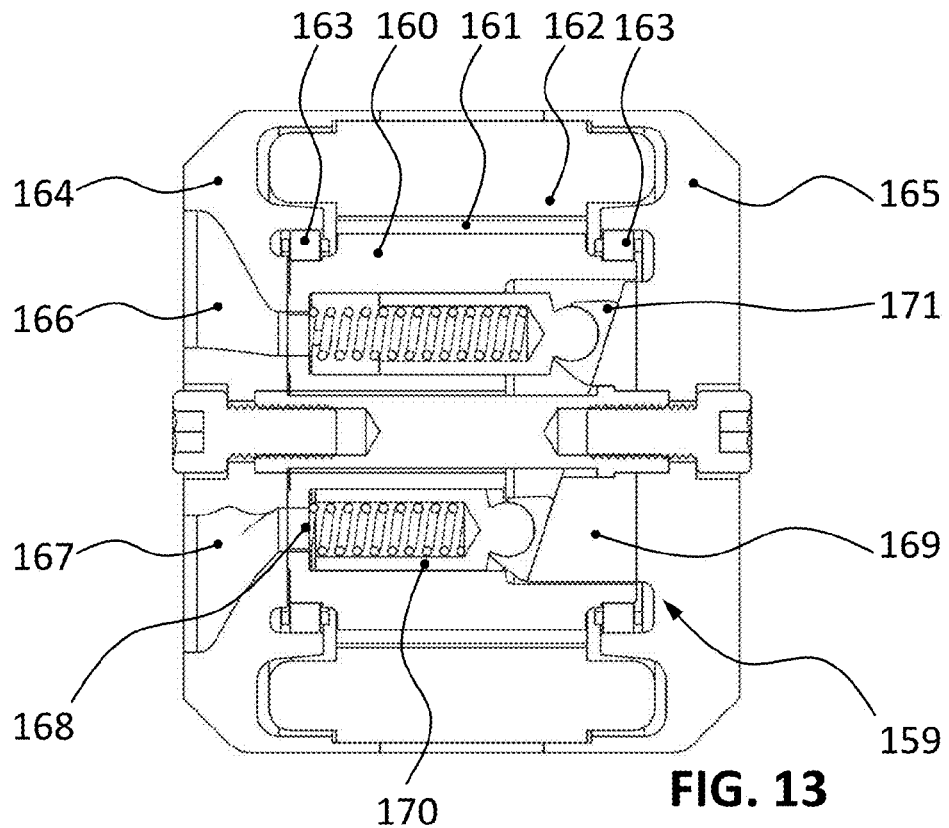
Figure 13:
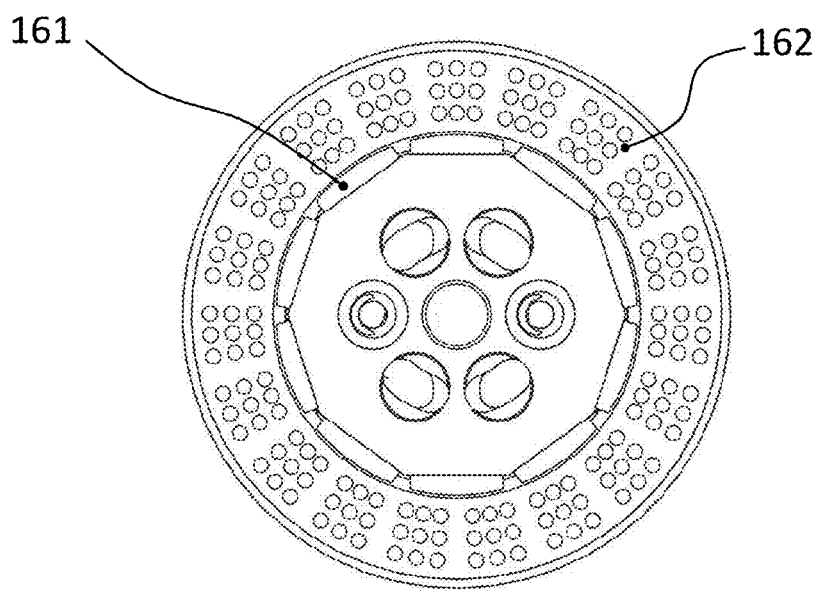

Certain applications such as industrial, military and aerospace, may require a higher performance hydraulic power supply, in terms of pressure capacity and efficiency to deliver the required power density. In the embodiment of FIGS. 13 and 13A, an integrated motor/generator unit, comprising of an axial piston unit positioned concentric and coplanar with the generator is shown. This embodiment is similar to that shown in FIG. 3, but the hydraulic unit is now an axial piston unit (i.e. a swashplate unit) as opposed to a gerotor pump. A swashplate pump may offer high performance, in terms of pressure capacity, speed, efficiency and durability, when compared to other types of hydraulic pumps.

In the embodiment shown, the cylinder block 160 of the axial piston unit 159 is drivingly connected to the magnets 161 of the generator 162 and is supported by bearings 163 to the end caps 164 and 165. The end cap 163 contains a first port 166 and second port 167 that are arranged to act as a commutation plate to direct flow into and out of the cylinder block 160 via passages 168. A swashplate 169 is located opposite the cylinder block passages 168 on the end cap 165. A plurality of pistons 170 are contained within the bores of the cylinder block 160 and are held against the swashplate by the piston feet 171. The method in which the pistons are help against the swashplate and are forced to cam in and out of the cylinder bores is well known in the art, and it is not in the scope of this patent to define these actions, also the method in which the cylinder block is loaded against the commutation plate (via springs or other means) is similarly known.

When electrical power is fed into the generator, it will act as an electric motor and cause the cylinder block 160 to rotate, this in turn will cause pumping via the pistons 170, and flow will take place via the first and second ports. The direction of flow will be dependent upon the direction of rotation of the cylinder block which is turn dependent upon the direction of current to fed into the electric motor. Conversely if either the first or second port is pressurized then the axial piston unit will act as a motor and will spin under this pressure differential. This will in turn generate electricity via the generator as described previously.

By controlling the speed of the electric motor, the speed and hence the flow rate, of the axial piston unit can be varied without having to vary the swept displacement of the unit. Many variations of variable displacement axial piston pumps exist, and whilst they have the advantage of being able to control the flow rate to meet the demand, they all have the disadvantage that as their swept displacement approaches zero, their volumetric efficiency decreases.

The benefit of arranging the axial piston unit concentric and coplanar with the motor/generator is that an axial piston pump, which is of equal or smaller size than a variable displacement axial piston pump, will be able to offer a variable flow rate whilst remaining at its maximum swept displacement, thereby maintaining its volumetric displacement.

In some use scenarios, it is desirable to have an energy-generating damper that is not gas-pressure limited in compression damping, features energy capture in both compression and rebound, the embodiments shown in FIG. 14 and in FIG. 14A will now be described that incorporate the above features.

Figures 14, 14A:
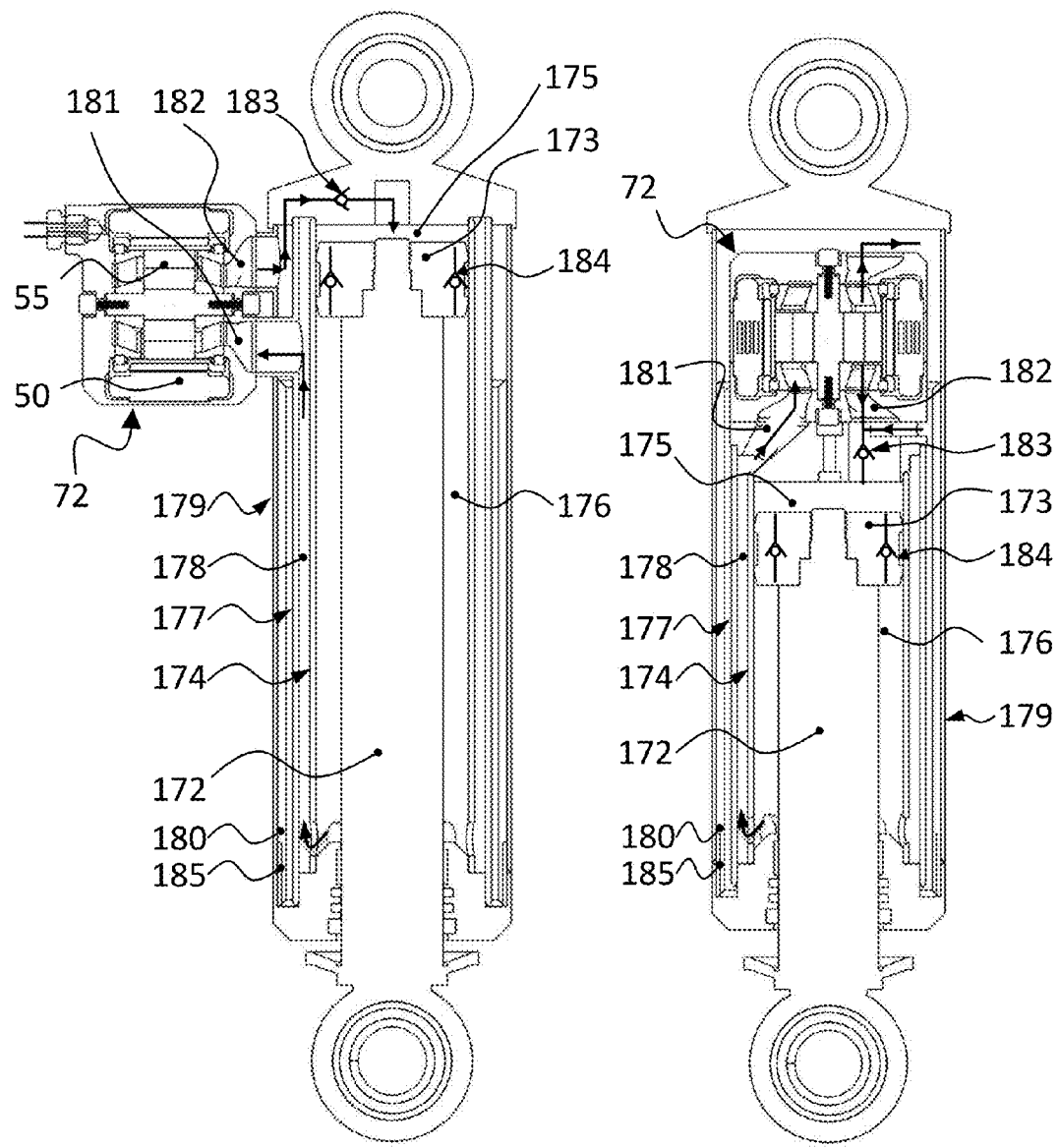
FIGS. 14 and 14A show an embodiment of an integrated energy-recovering tri-tube damper with a hydraulic motor electric motor/generator side valve and base valve.

According to the embodiments shown in FIG. 14 and in FIG. 14A, a tri-tube damper design that incorporates an energy-harvesting IMGU is disclosed. In this embodiment, a piston rod 172 and hydraulic-ram type (solid) piston 173 are disposed in an inner fluid-filled cylinder 174. The inner housing (collectively, the compression volume 175 and the extension volume 176) is surrounded by a second tube 177 that is concentric to the inner tube 174. The space between the inner tube and the second tube contains the high-pressure volume 178. The second tube 177 is surrounded by a third tube 179 that is concentric to the second tube. The space between the second tube and the third tube contains the low-pressure volume 180. In some embodiments the high-pressure and low-pressure tubes may be reversed.

In the embodiment of FIG. 14, an integrated motor/generator unit (IMGU) 72 is side located at the base end of the damper and in the embodiment of FIG. 14A, an integrated motor/generator unit (IMGU) 72 is located at the base end of the damper. The IMGU shown in FIG. 14 and FIG. 14A is similar to that as shown in FIG. 3, alternatively, it may be similar to that as shown in FIG. 1 or FIG. 2, and includes a first port 181 and a second port 182. The first port 181 is in fluid communication with the high-pressure volume 178 and the second port 182 is in fluid communication with the low-pressure volume 180.

During jounce, the piston rod 172 pushes the piston 173 into the compression volume 175, the fluid in the compression volume 175 is blocked from flowing into the low pressure volume by a directional check valve 183, and is forced to flow from the compression volume 175 into the extension volume 176 via a directional check valve 184 contained in the piston 173. As the volume displaced in the compression chamber is greater than the volume created in extension chamber by the volume of the piston rod 172, the volume differential passes through the high pressure volume 178 into the first port 181 of the IMGU 72, and out the second port 182, into the low pressure volume 180. Simultaneously, a compressible medium 185 such as foam cell, or bladder, or gas volume in the low-pressure volume 180 compresses to displace introduced piston rod volume.

During rebound, the piston rod 172 pulls the piston 173 into the extension volume 176, the fluid in the extension volume 176 is blocked from flowing into the low compression volume by the directional check valve 184 and is forced to pass from the extension volume into the high pressure volume 180. The high pressure volume 180 is in fluid communication with the first port 181 of the IMGU 72. Fluid passes from the high pressure volume 180, through the first port 181, through the IMGU 72, and out the second port 182, into the low pressure volume 180, through a directional check valve 183, and into the compression volume 175. Simultaneously, the compressible medium 185 in the low-pressure volume 180 decompresses as fluid passes from the low pressure chamber 180 through the directional check valve 183 into the compression volume to replace the extracted piston rod volume.

As fluid flows from the high pressure volume 178, through the porting 181 into the IMGU 72, and out of the IMGU from the porting 182 back into the low pressure volume 180, the hydraulic motor 55 and generator 50 rotate. This generates back electromotive force (EMF) from the motor/generator to provide damping and produces electricity as described in the embodiment of FIG. 2. As discussed previously, the kinematic characteristic of the damper can be altered by varying the electrical characteristics on the terminals of the electric motor/generator. In addition, by supplying power to the electric motor/generator the damping force of the system can be increased beyond the range of that offered by the back EMF under power regeneration mode, or decreased below that offered by the resistance from the system open-circuit parasitic losses. The motor/generator can be driven so that the fluid flow from the hydraulic motor resists fluid flow from the damper, in either compression or rebound, thereby increasing the damper force, or it can be driven so that the fluid flow from the hydraulic motor to assists fluid flow from the damper, in either compression or rebound, thereby decreasing the damper force. The motor/generator can also be driven so that the fluid flow from the hydraulic motor resists fluid flow from the damper to the point that the damper is held stationary. However in this embodiment, the damper cannot be actively driven so that the damper will extend or retract from power being supplied to the motor/generator. The present invention is not limited in this regard, however, and when used in a monotube configuration, for example, is able to extend and retract from power being supplied to the motor/generator without additional valving. In the triple-tube arrangement, if the motor/generator is driven to extend the damper, fluid flow from the second port 182 will free flow through the check valves 183 and 184 back into the first port 181, and if motor/generator is driven to retract the damper then fluid flow from the first port 181 will pressurize the extension chamber 176, which will in turn pressurize the compression chamber 175, however the check valve 183 will block any flow from the compression chamber thereby not allowing retraction of the piston rod.

Figure 15:
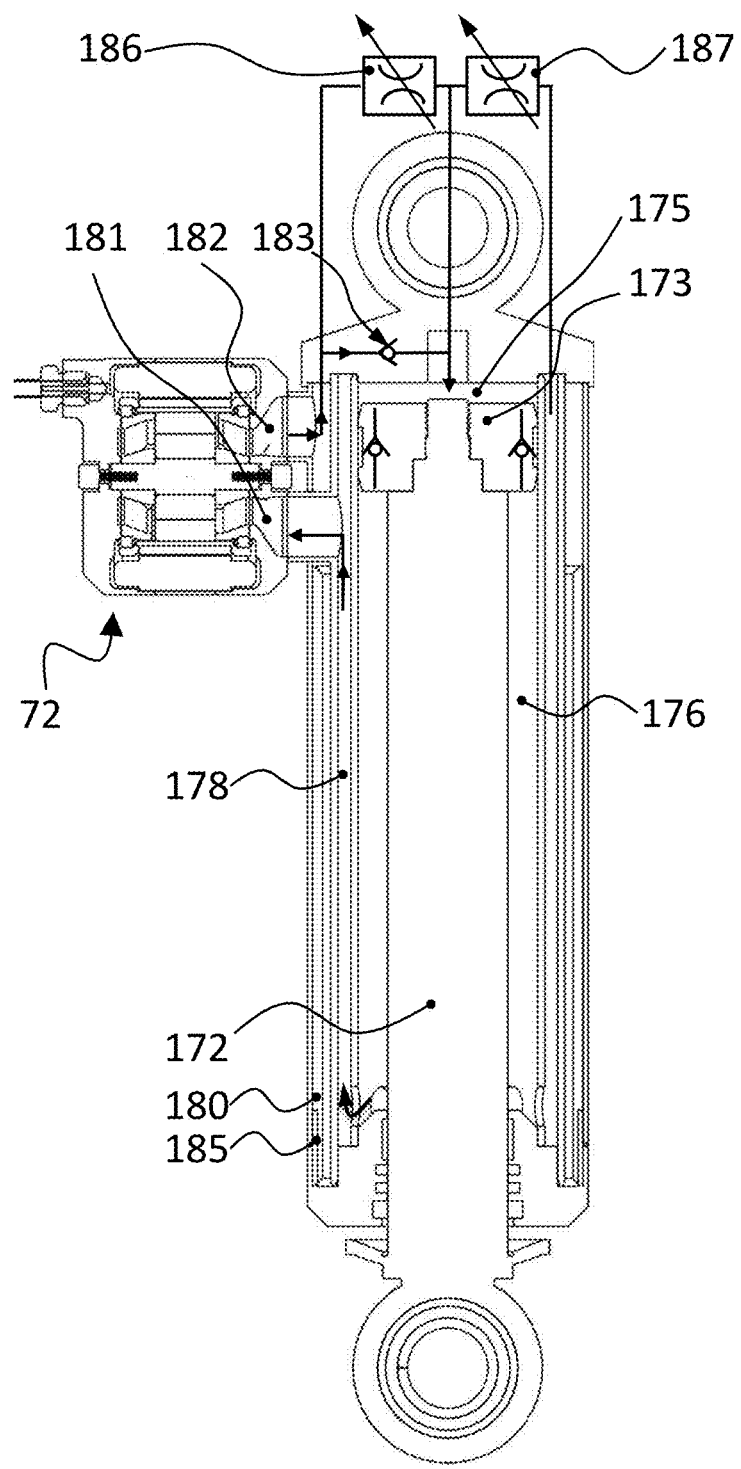
FIG. 15 shows an embodiment of an integrated energy-recovering tri-tube damper with a hydraulic motor electric motor/generator and controlled hydraulic valves.

In some use scenarios it is desirable to be able to actively extend or retract the damper by supplying power to the motor/generator and additional valves may be be required depending on the embodiment. The embodiment shown in FIG. 15 will now be described that incorporates additional valves. According to the embodiment shown in FIG. 15, a tri-tube damper design that incorporates an energy-harvesting IMGU 72 similar to that shown in FIG. 14 is disclosed (alternatively, it may be similar to that shown in FIG. 14A). In this embodiment, controlled valves 186 and 187 are incorporated to allow the damper to be actively extended or retracted by supplying power to the motor/generator. The controlled valves 186 and 187 may be controlled electronically or hydraulically or by other means.

When the damper is required to be extended, electrical power is supplied to the motor/generator so that there is fluid flow from the first port 181 of the IMGU 72 to the high pressure chamber 178. The controlled valve 186 is held closed and the controlled valve 187 is opened to allow fluid flow from the high pressure chamber 178 to the compression chamber 175, the check valve 183 closes to block flow from the compression chamber 175 to the low pressure chamber 180. As the high pressure chamber 178 is in fluid communication with the extension volume 176, pressure will now exist on both the extension side and compression side of the piston 173, and because of the area differential across the piston, which is equal to the piston rod area, the piston will extend. As the piston extends, fluid is displaced from the extension volume to 176, through the high pressure chamber 178 and the controlled valve 187 to the compression chamber 175, simultaneously fluid will flow from the low pressure chamber into the second port 182 of the IMGU 72 decompressing the compressible medium 185 therein.

When the damper is required to be retracted, electrical power is supplied to the motor/generator so that there is fluid flow from the first port 181 of the IMGU 72 to the high pressure chamber 178. The controlled valve 187 is held closed and the controlled valve 186 is opened so that the compression chamber 175 is in fluid communication with the low pressure chamber 180, bypassing the check valve 183. As the compression volume 175 is now in fluid communication with the low pressure chamber 180, a pressure differential across the piston will exist causing the piston to retract. As the piston retracts, fluid will flow from the compression chamber 175 to the low pressure chamber 180 and into the second port 182 of the IMGU 72. Because the volume of the compression chamber 175 is larger than the volume of extension chamber 176 by the rod volume, this volume differential will flow from the compression chamber 175 to the low pressure chamber 180 compressing the compressible medium 185 therein.

In some embodiments the integrated systems disclosed herein may be used in conjunction with passive damping, either in parallel with bypass valves, or in series with the hydraulic motor. Passive valving is well known in the art, often incorporating shim stacks, directional valves, and spring-loaded fluid-restrictive porting. Bypass paths may allow for either lower damping than the viscous losses through the hydraulic motor can allow, or to tune subtle ride characteristics, however, the present invention(s) is not limited in this regard. Series valving may allow for higher damping than the electric generator can provide in full saturation (at very high velocities), a requirement especially important in heavy duty use scenarios such as military dampers. Parallel or series damping can be incorporated directly on the piston head, in external bypass tubes, in base valves, or elsewhere.

In some applications the dynamic range required by the damper may be beyond that which can be reasonably supplied by the hydraulic motor and generator. In such applications the integrated systems disclosed herein may be used in conjunction with one or more active/controlled valves, either in parallel or in series (or a combination of both) with the hydraulic motor. In one embodiment, one or more active/controlled valves may be used separately or in combination with one or more passive valves. The active/controlled valves may be adapted to operate at a predetermined pressure. The predetermined pressure may be varied to according to the operating needs of the damper, hydraulic motor, or generator. In addition, the pressure may be selected to dynamically increase or decrease the damping range beyond that which can be supplied by the hydraulic motor and generator. One or more of the active/controlled valves may be controlled electrically or by some form of mechanical or hydro-mechanical actuation. In addition, one or more active/controlled valves may be adapted to provide a unidirectional flow of fluid. By placing the controlled valves in parallel with the hydraulic motor, flow can be diverted by an externally controllable means to bypass the hydraulic motor to lower damping forces by reducing the viscous losses through the hydraulic motor. By placing the controlled valves in series, flow can be restricted either into or out of the hydraulic motor by an externally controllable means to increase the damping forces beyond which the generator can supply at full saturation. These valves can be incorporated directly on the piston head, externally in base valves, or elsewhere.

In some embodiments where the device is used as an actuator instead of, or as well as, an energy harvesting damper, additional control valves such as load holding valves, pressure limiting valves, etc. may be incorporated to provide different functionality as required by the application.

According to some embodiments, a controller may provide a varying impedance to the electric generator to control the force response of the damper based on various parameters such as velocity or position, while simultaneously capturing energy associated with movement in the damper. The force response may follow an equation or a lookup table based on such parameters. This level of control is called semi-active damping, as the amount of damping is controlled, but the system is not actuated. In other use scenarios, the electric motor/generator in the damper can be actuated to allow for fully-active control.

In some embodiments the integrated systems disclosed herein may be used in an autonomous fashion where the controller bootstraps power from the energy-harvesting damper. This allows for either a semi-active damper, or in some embodiments, an active damper that generates electricity and uses the electricity to power its own control circuitry. Such a system may allow for easy vehicle retrofits with the improved semi-active or fully-active suspensions without the requirement of running wires along the vehicle chassis. In one embodiment, a bootstrap capacitor is tied to the output of the energy generating damper. As the damper generates electricity, the capacitor is charged. Meanwhile, the controller's power input is connected in parallel to this capacitor. As soon the bootstrap capacitor reaches some voltage to threshold, the controller turns on and begins controlling the kinematic characteristic on the damper by using its own generated electricity. Capacitors or a small battery can be used on the input of the controller to filter transient voltage inputs.

It should be appreciated that in many embodiments, the systems described herein may be used in conjunction with a spring mechanism to either compress or extend the piston rod.

It should be appreciated that for vehicular applications, the embodiments shown can be configured as dampers or as strut type dampers as the applications requires.

What is claimed is:

1. An active suspension comprising:
   a damper assembly including:
     a first housing;
     a piston, slidably received in the first housing, with a first side and a second side, wherein a piston rod is attached to the second side of the piston;
     a second housing;
     a hydraulic motor/pump with a first port and a second port;
     an electric motor/generator operatively coupled to the hydraulic motor/pump, wherein the hydraulic motor/pump and at least a portion of the electric motor/generator are at least partially enclosed in the second housing;
     a first volume within the first housing that is at least partially filled with hydraulic fluid, and wherein during at least one mode of operation the first volume receives fluid from the hydraulic motor/pump;
     a second volume; and
     a valve that controls at least a portion of hydraulic fluid flow between one of the first volume and the hydraulic motor/pump, and the first volume and the second volume;
     wherein the first housing and the second housing are attached to form a single hydraulically self-contained unit.

2. The system of claim 1, further comprising a controller operatively coupled to the electric motor/generator wherein the controller controls the electric motor/generator to produce at least one of improved ride comfort and improved terrain traversal characteristics.

3. The system of claim 2 wherein the electric motor generator is an electric motor and the hydraulic motor/pump is a hydraulic pump.

4. The system of claim 1, further comprising an accumulator in bi-directional fluid communication with at least one of the first volume, the second volume, and at least one of the first port and the second port of the hydraulic motor/pump.

5. The system of claim 1, wherein the first volume is bounded in part by the first side of the piston and the second volume is in the second housing and bounded in part by the second side of the piston.

6. The system of claim 5, wherein the valve is one of a blow-off valve and a bypass valve that selectively permits a quantity of hydraulic fluid to flow between the first volume and the second system volume without flowing through the hydraulic motor/pump.

7. The system of claim 5, wherein the first port is in fluid communication with the first volume and the second port is in fluid communication with the second volume.

8. The system of claim 7, wherein there is direct fluid communication between at least one of the first port of the hydraulic motor/pump and the first volume and the second port of the hydraulic motor/pump and the second volume.

9. The system of claim 1, wherein the valve is one of a blow-off valve, a check valve, a pressure controlled valve, and an electrically controlled valve.

10. The system of claim 1, wherein in at least one operating mode the hydraulic motor/pump is operated as a pump and the electric motor/generator is operated as an electric motor.

11. The system of claim 1, wherein the first housing contains a quantity of hydraulic fluid.

12. The system of claim 1, wherein the hydraulic motor/pump varies speed in at least one mode of operation.

13. The system of claim 1, further comprising a controller operatively coupled to the electric motor/generator, wherein the controller is at least partially powered by the generator in at least one operating mode.

14. The system of claim 1, further comprising a controller operatively couple to the electric motor/generator, wherein the controller controls fluid flow through the hydraulic motor/pump by controlling an electrical characteristic of the electric motor/generator.

15. The system of claim 14, wherein the electrical characteristic is an electromotive force of the electric motor/generator.

16. The system of claim 14, wherein the electrical characteristic is an impedance applied to terminals of the electric motor/generator.

17. The system of claim 1, wherein during at least one operating mode fluid flows through the valve and the valve is positioned in parallel or in series with the hydraulic motor/pump.

18. The system of claim 1, wherein the controller controls the electric motor/generator to operate the hydraulic motor/pump to provide a damping force to the piston.

19. The system of claim 1, wherein in at least one operating mode the hydraulic motor/pump operates at a maximum speed and the maximum speed is limited by the valve.

20. A linear actuator system comprising:
    a hydraulic motor/pump comprising a first port and a second port;
    an electric motor/generator operatively coupled to the hydraulic motor/pump;
    a first housing that at least partially encloses the hydraulic motor/pump and the electric motor/generator;
    a second housing that slidably receives a piston with a first side and a second side wherein a piston rod is attached to the second side of the piston, wherein the piston divides at least a portion of the second housing into a first volume and a second volume;

a first flow path between the first volume and the second volume that passes through the first port and the second port of the hydraulic motor/pump;

a second flow path between the first volume and the second volume that bypasses the hydraulic motor/pump;

a valve controlling flow through at least one of the first flow path and the second flow path;

wherein the first housing and the second housing are attached to form a single hydraulically self-contained unit, and wherein the electric motor/generator and the hydraulic motor/pump cooperate to apply one of a damping force on the piston and an active force on the piston.

21. A method of operating an actuator of an active suspension system of a vehicle, the method comprising:

controlling an electric motor/generator operatively coupled to a hydraulic motor/pump to drive the hydraulic motor/pump in a first operating mode at a first speed to produce a differential pressure on a piston, wherein the electric motor/generator and the hydraulic motor/pump are at least partially contained in a first housing, and the piston is slidably received in a second housing, wherein the first housing and the second housing are attached to form a single hydraulically self-contained unit;

controlling the electric motor/generator in a second operating mode at a second speed; and operating a valve to control at least one pressure in the self-contained unit in at least one operating mode.

22. The method of claim 21, wherein the valve is a blow-off valve.

* * * * *

UNITED STATES PATENT AND TRADEMARK OFFICE
CERTIFICATE OF CORRECTION

PATENT NO. : 9,689,382 B2  
APPLICATION NO. : 14/681630  
DATED : June 27, 2017  
INVENTOR(S) : Clive Tucker et al.

Page 1 of 1

It is certified that error appears in the above-identified patent and that said Letters Patent is hereby corrected as shown below:

In the Claims

At Column 28, Claim 5, please replace the word "second" with "first" as indicated below:

5. The system of claim 1, wherein the first volume is bounded in part by the first side of the piston and the second volume is in the first housing and bounded in part by the second side of the piston.

At Column 28, Claim 14, please add the letter "d" to the word "couple" as indicated below:

14. The system of claim 1, further comprising a controller operatively coupled to the electric motor/generator, wherein the controller controls fluid flow through the hydraulic motor/pump by controlling an electrical characteristic of the electric motor/generator.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*